(12) United States Patent
Mori et al.

(10) Patent No.: US 11,420,801 B2
(45) Date of Patent: Aug. 23, 2022

(54) METAL SHEET FOR CONTAINERS AND METHOD FOR MANUFACTURING SAME

(71) Applicant: NIPPON STEEL & SUMITOMO METAL CORPORATION, Tokyo (JP)

(72) Inventors: Yoichiro Mori, Tokyo (JP); Nobuo Kadowaki, Tokyo (JP); Tadaaki Ochiai, Tokyo (JP); Akihiko Hirata, Tokyo (JP); Tomohiro Mizutani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 143 days.

(21) Appl. No.: 16/082,905

(22) PCT Filed: Mar. 10, 2017

(86) PCT No.: PCT/JP2017/009749
§ 371 (c)(1),
(2) Date: Sep. 6, 2018

(87) PCT Pub. No.: WO2017/155099
PCT Pub. Date: Sep. 14, 2017

(65) Prior Publication Data
US 2019/0092543 A1 Mar. 28, 2019

(30) Foreign Application Priority Data
Mar. 10, 2016 (JP) .............................. JP2016-046896

(51) Int. Cl.
*B65D 65/40* (2006.01)
*B32B 15/09* (2006.01)
(Continued)

(52) U.S. Cl.
CPC .............. *B65D 65/40* (2013.01); *B29C 65/02* (2013.01); *B32B 15/09* (2013.01); *B32B 27/36* (2013.01);
(Continued)

(58) Field of Classification Search
None
See application file for complete search history.

(56) References Cited

U.S. PATENT DOCUMENTS 4,362,775 A * 12/1982 Yabe ..................... B32B 15/08
428/213
5,389,451 A * 2/1995 Ooniwa .................. B32B 15/08
428/612
(Continued)

FOREIGN PATENT DOCUMENTS

EP 3109178 A1 12/2016
JP 61-149340 A 7/1986
(Continued)

OTHER PUBLICATIONS

JP 2014-008739 A (Kitagawa et al) (published Jan. 20, 2014) (Google Patents machine translation) (Year: 2014).*
(Continued)

*Primary Examiner* — Vivian Chen
(74) *Attorney, Agent, or Firm* — Birch, Stewart, Kolasch & Birch, LLP

(57) ABSTRACT

A metal sheet for containers includes a metal sheet and a polyester film which is laminated on a surface of the metal sheet to be an inner surface side of containers. The polyester film contains a wax in an amount of 0.010 to 2.000 mass %, and has a dipole-dipole force of 40 mN/m or less.

7 Claims, 4 Drawing Sheets

(51) Int. Cl.
| | |
|---|---|
| *B29C 65/02* | (2006.01) |
| *B32B 27/36* | (2006.01) |
| *B32B 37/10* | (2006.01) |
| *B32B 37/16* | (2006.01) |
| *B32B 15/20* | (2006.01) |
| *B32B 27/18* | (2006.01) |
| *B32B 15/18* | (2006.01) |
| *B65D 85/72* | (2006.01) |
| *B65D 6/00* | (2006.01) |
| *B29K 67/00* | (2006.01) |
| *C08L 67/02* | (2006.01) |
| *C08L 91/08* | (2006.01) |
| *C08L 67/03* | (2006.01) |

(52) U.S. Cl.
CPC .......... *B32B 37/10* (2013.01); *B29K 2067/00* (2013.01); *B29K 2067/003* (2013.01); *B29K 2067/006* (2013.01); *B32B 15/18* (2013.01); *B32B 15/20* (2013.01); *B32B 27/18* (2013.01); *B32B 37/16* (2013.01); *B32B 2250/03* (2013.01); *B32B 2250/04* (2013.01); *B32B 2255/06* (2013.01); *B32B 2255/205* (2013.01); *B32B 2307/30* (2013.01); *B32B 2307/70* (2013.01); *B32B 2307/748* (2013.01); *B32B 2311/24* (2013.01); *B32B 2311/30* (2013.01); *B32B 2367/00* (2013.01); *B32B 2439/66* (2013.01); *B32B 2439/70* (2013.01); *B65D 7/00* (2013.01); *B65D 85/72* (2013.01); *B65D 2517/00* (2013.01); *C08L 67/02* (2013.01); *C08L 67/03* (2013.01); *C08L 91/08* (2013.01); *Y10T 428/31681* (2015.04); *Y10T 428/31786* (2015.04)

(56) References Cited

U.S. PATENT DOCUMENTS

| | | | | | |
|---|---|---|---|---|---|
| 5,618,621 | A | * | 4/1997 | Hasegawa | B32B 27/36 428/343 |
| 5,753,377 | A | * | 5/1998 | Takahashi | B32B 15/08 428/480 |
| 2004/0101698 | A1 | * | 5/2004 | Yamanaka | B32B 27/36 428/461 |
| 2004/0219316 | A1 | * | 11/2004 | Takahashi | C08J 5/18 428/35.7 |
| 2005/0260417 | A1 | * | 11/2005 | Yamanaka | B32B 15/09 428/425.8 |
| 2008/0261063 | A1 | * | 10/2008 | Yamanaka | B32B 1/02 428/483 |
| 2009/0068481 | A1 | * | 3/2009 | Yamanaka | B32B 27/36 428/458 |
| 2010/0310824 | A1 | * | 12/2010 | Oshima | B32B 27/16 428/141 |
| 2010/0320216 | A1 | * | 12/2010 | Kurokawa | C23C 22/58 220/680 |
| 2014/0162055 | A1 | * | 6/2014 | Kitagawa | B32B 27/18 428/336 |
| 2014/0339123 | A1 | * | 11/2014 | Nakagawa | B32B 15/08 206/524.2 |
| 2016/0186005 | A1 | * | 6/2016 | Kimiduka | C08G 63/199 428/35.8 |
| 2016/0355294 | A1 | * | 12/2016 | Yamanaka | B05D 7/14 |
| 2017/0008256 | A1 | * | 1/2017 | Yamanaka | B05D 7/14 |
| 2018/0065339 | A1 | * | 3/2018 | Yamanaka | C21D 9/46 |
| 2020/0377274 | A1 | * | 12/2020 | Kawai | B32B 27/36 |

FOREIGN PATENT DOCUMENTS

| | | | |
|---|---|---|---|
| JP | 10-151699 A | | 6/1998 |
| JP | 2001-220453 A | | 8/2001 |
| JP | 2001-328204 A | | 11/2001 |
| JP | 2002-187963 A | * | 7/2002 |
| JP | 2002-264256 A | | 9/2002 |
| JP | 2002-302560 A | | 10/2002 |
| JP | 2004-168365 A | * | 6/2004 |
| JP | 2004-168365 A | | 6/2004 |
| JP | 2005-342910 A | * | 12/2005 |
| JP | 2005-342912 A | * | 12/2005 |
| JP | 2006-69212 A | | 3/2006 |
| JP | 2006-326902 A | | 12/2006 |
| JP | 2006-326902 A | * | 12/2006 |
| JP | 2007-203570 A | | 8/2007 |
| JP | 2007-245441 A | | 9/2007 |
| JP | 2007-253454 A | | 10/2007 |
| JP | 2011-255605 A | | 12/2011 |
| JP | 2014-8739 A | | 1/2014 |
| TW | 201544310 A | | 12/2015 |

OTHER PUBLICATIONS

JP 2006-069211 A (Yamanaka et al) (published Mar. 16, 2006) (Google Patents machine translation) (Year: 2006).*
JP 2007-203570 A (Okuyama et al) (published Aug. 16, 2007) (Google Patents machine translation) (Year: 2007).*
JP 2002-302560 A (Matsui et al) (published Oct. 18, 2002) (Google Patents machine translation) (Year: 2002).*
JP 2001-328204 A (Yamanaka et al) (published Nov. 27, 2001) (Google Patents machine translation) (Year: 2001).*
JP 2006-326902 A (Nozawa et al) (published Dec. 7, 2006) full English translation (2006) (Year: 2006).*
Extended European Search Report, dated Sep. 6, 2019, for European Application No. 17763431.8.
International Search Report for PCT/JP2017/009749 (PCT/ISA/210) dated Jun. 6, 2017.
Taiwanese Office Action issued in TW Patent Application No. 106108056 dated Sep. 27, 2017.
Written Opinion of the International Searching Authority for PCT/JP2017/009749 (PCT/ISA/237) dated Jun. 6, 2017.
Ikada, et al., "Surface Energy of polymers (3)," Journal of the Adhesion Society of Japan, vol. 15. No. 3, 1979, pp. 9-19.
Notice of Reasons for Revocation, dated Jun. 2, 2021, for corresponding Japanese Application No. 2018-504610, with an English machine translation.
Onda et al., "Wetting Technical Handbook—Foundation, Measurement Evaluation and Data," An incorporated company techno system, 2nd-printing, Dec. 20, 2005, pp. 25-34 (total 13 pages).

* cited by examiner

METAL SHEET FOR CONTAINERS AND METHOD FOR MANUFACTURING SAME

TECHNICAL FIELD OF THE INVENTION

The present invention relates to a metal sheet for containers and a method for manufacturing the same.

Priority is claimed on Japanese Patent Application No. 2016-46896, filed on Mar. 10, 2016, the content of which is incorporated herein by reference.

RELATED ART

In a case in which a metal sheet for containers is processed and used as a container, there are cases in which a painting treatment is carried out on the surface of the metal sheet. However, the painting treatment is complicated, and thus there is a problem in that the painting treatment degrades productivity regarding the manufacturing of the container and a large amount of a solvent is discharged due to the painting treatment.

In order to solve the above-described problem, a method of laminating a thermoplastic resin film on a surface of a heated metal sheet using a lamination roll instead of carrying out the painting treatment on the surface of the metal sheet is proposed (there are cases in which a metal sheet having a thermoplastic resin film laminated on a surface is referred to as a laminate metal sheet). However, in a case in which the laminate metal sheet is used as a food container such as a can, there is a problem in that food that is a content of the container strongly adheres to an inner surface of container and the release of the food is difficult.

In contrast, a method for facilitating the release of food by adding a wax to a thermoplastic resin film is proposed in Patent Documents 1, 2, and the like.

PRIOR ART DOCUMENT

Patent Document

[Patent Document 1] Japanese Unexamined Patent Application, First Publication No. 2001-328204
[Patent Document 2] Japanese Unexamined Patent Application, First Publication No. 2004-168365

DISCLOSURE OF THE INVENTION

Problems to be Solved by the Invention

In the technique disclosed in Patent Documents 1 and 2, there is a case in which the release of food is not sufficiently easy, and there is a case in which productivity degrades due to the adhesion or deposition of the wax to the lamination roll. In addition, in the technique disclosed in Patent Documents 1 and 2, there is a case in which the wax is eluted into the food and affects the flavor or there is a case in which the amount of the wax added to the thermoplastic resin film is increased in order to ensure the easiness of releasing the food even after the elution of the wax into the food, which is not economically efficient.

The present invention has been made in consideration of the above-described circumstances, and an object of the present invention is to provide a metal sheet for containers having an excellent easiness of content release and a method for manufacturing the same.

Means for Solving the Problem

The present invention employs the following means in order to solve the above-described problems and achieve the relevant object.

(1) A metal sheet for containers according to the present invention includes a metal sheet and a polyester film which is laminated on a surface of the metal sheet which is scheduled to be an inner surface side of containers. The polyester film contains a wax in an amount of 0.010 to 2.000 mass %, and has a dipole-dipole force of 40 mN/m or less.

(2) The metal sheet for containers according to (1), the wax may be one or more of a polyethylene wax, a polypropylene wax, and sodium stearate.

(3) In the metal sheet for containers according to (1) or (2), in which the polyester film may be a laminate film having two or more layers, and at least a top layer on the inner surface side of containers after lamination may contain 0.010 to 2.000% of the wax in terms of a mass ratio.

(4) In the metal sheet for containers according to (3), a total amount of polyethylene terephthalate and polyethylene naphthalate in the top layer on the inner surface side of containers after lamination may be 80 mol % or more of the polyester included in the top layer.

(5) In the metal sheet for containers according to (3) or (4), an amount of polybutylene terephthalate in a layer of the laminate film on the metal sheet side may be 5 to 80 mol % of the polyester included in the layer.

(6) In the metal sheet for containers according to any one of (1) to (5), a polyester film having a crystallization temperature of 120° C. or lower may be laminated on a surface of the metal sheet, which is scheduled to be an outer surface side of containers.

(7) A method for manufacturing a metal sheet for containers according to the present invention, including: a laminating step of passing a metal sheet and a polyester film containing polyester and 0.010 to 2.000 mass % of a wax through a pair of lamination rolls in a sandwiched state to laminate the polyester film on a surface of the metal sheet which is scheduled to be an inner surface side of containers; and a cooling step of cooling the metal sheet having the polyester film laminated on the surface after the laminating step, in which Tr (unit: ° C.) that is a temperature of the pair of lamination rolls is equal to or higher than Tg (unit: ° C.) that is a glass transition temperature of the polyester film and equal to or lower than Tm (unit: ° C.) that is a melting point of the wax, and t (unit: seconds) that is a time taken from an end of the laminating step to a start of the cooling step satisfies Expression (1).

$$0.9 - \{0.4/(Tm-Tg)\} \times (Tr-Tg) \leq t \leq 2.6 - \{0.4/(Tm-Tg)\} \times (Tr-Tg) \quad (1)$$

(8) A metal sheet for containers according to the present invention may be a metal sheet for containers manufactured using the method for manufacturing a metal sheet for containers according to (7), the metal sheet for containers including a metal sheet and a polyester film which is laminated on a surface of the metal sheet which is scheduled to be an inner surface side of containers, wherein the polyester film contains a wax in an amount of 0.010 to 2.000 mass %, and has a dipole-dipole force of 40 mN/m or less.

(9) In the metal sheet for containers according to (8), the wax may be one or more of a polyethylene wax, a polypropylene wax, and sodium stearate.

(10) In the metal sheet for containers according to (8) or (9), in which the polyester film may be a laminate film having two or more layers, and at least a top layer on the inner surface side of containers after lamination may contain 0.010 to 2.000% of the wax in terms of a mass ratio.

(11) In the metal sheet for containers according to (10), a total amount of polyethylene terephthalate and polyethylene naphthalate the top layer on the inner surface side of containers after lamination may be 80 mol % or more of the polyester included in the top layer.

(12) In the metal sheet for containers according to (10) or (11), a amount of polybutylene terephthalate in a layer of the laminate film on the metal sheet side may be 5 to 80 mol % of the polyester included in the layer.

(13) In the metal sheet for containers according to any one of (8) to (12), a polyester film having a crystallization temperature of 120° C. or lower may be laminated on a surface of the metal sheet, which is scheduled to be an outer surface side of containers.

Effects of the Invention

According to the respective aspects, it is possible to provide a metal sheet for containers having an excellent content release properties and a method for manufacturing the same.

EMBODIMENTS OF THE INVENTION

Figure 1:
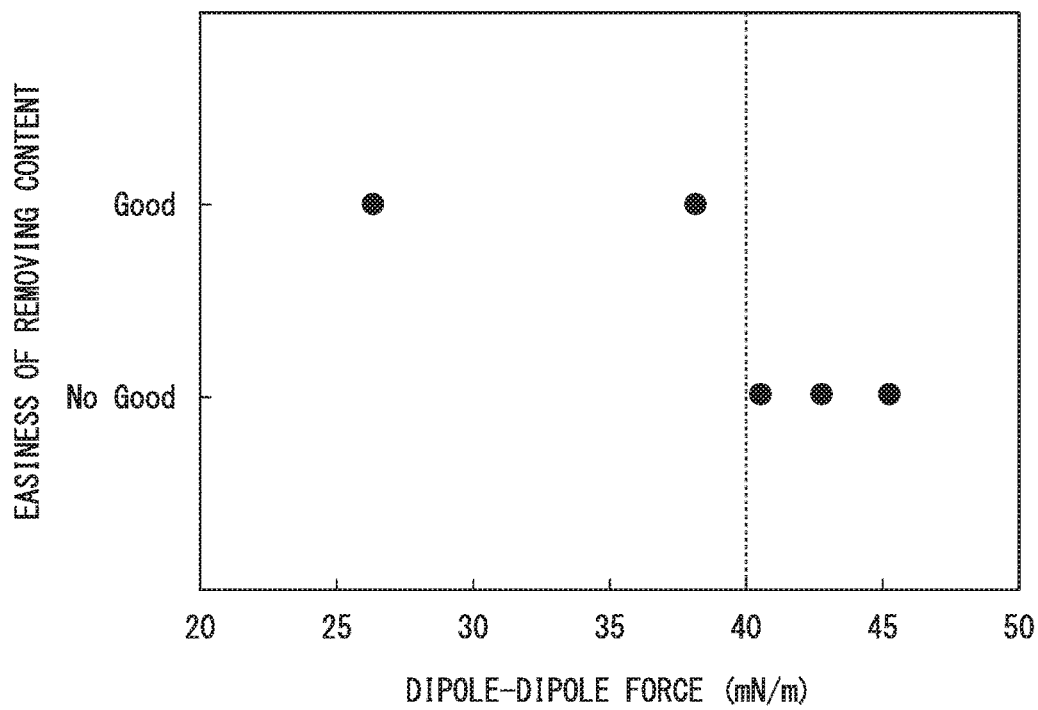
FIG. 1 is an explanatory view illustrating a relationship between a dipole-dipole force of a laminate film and an evaluation result of easiness of content release.

As a result of a variety of studies regarding the surface properties of a thermoplastic resin film which are considered to have an influence on the easiness of releasing a content (food) from a container for food, the present inventors found that a dipole-dipole force of the thermoplastic resin film is capable of serving as a new index of the easiness of releasing food.

The dipole-dipole force is one of forces generated by an electrostatic interaction between molecules and a force exerted between two molecules that have become permanent dipolars. As the force generated by the electrostatic interaction between molecules, in addition to the dipole-dipole force, the ionic bond force can be exemplified.

The easiness of releasing food from a container is determined by polarity of the food and the polarity of the surface of the thermoplastic resin film. Regarding the polarity of the surface of the thermoplastic resin film, it is considered that it becomes easier to release the food from the container as the polarity of the surface of the thermoplastic resin film decreases.

The polarity refers to a state in which a negative or positive electric bias is present in a molecule, and the degree of the electric bias determines the degree of the polarity.

The fact that it becomes easier to release food from the container as the force exerted on an interface between a surface of the food in the container and the surface of the thermoplastic resin film decreases is easily understood even sensously.

Generally, among forces exerted between molecules, the hydrogen bond force is stronger than the dipole-dipole force. However, on the surface of a laminate metal sheet, there are only a small number of hydrogen atoms that are covalently bonded to electrically negative atoms, and thus the hydrogen bond force is extremely weak. Therefore, the present inventors found that the hydrogen bond force is not appropriate as an evaluation index of the easiness of content release in the laminate metal sheet. In addition, the present inventors paid attention to the dipole-dipole force of the thermoplastic resin film as the evaluation index of the easiness of content release of the laminate metal sheet.

For the calculation of the dipole-dipole force, Expression (1) (Young, Dupre, and extended Fowkes' solid surface tension three-chemical composition-system expression) was used.

$$\gamma_L(1+\cos\theta) = 2\sqrt{\gamma_S^d \gamma_L^d} + 2\sqrt{\gamma_S^p \gamma_L^p} + 2\sqrt{\gamma_S^h \gamma_L^h}$$

where, the respective reference signs indicate the following.

$\gamma^d$: Dispersive force
$\gamma^p$: dipole-dipole force
$\gamma^h$: Hydrogen bond force
$\gamma_S$: Surface tension of film
$\gamma_L$: Surface tension of liquid The dipole-dipole force was computed using the following method. First, a polyester film that is one of thermoplastic resin films was laminated on a surface of a metal sheet, thereby manufacturing a metal sheet for containers. Next, the contact angles of three kinds of liquid samples having a surface tension, a dispersive force component, a dipolar component, and a hydrogen bond component that are known (hexadecane, methylene iodide, and water) with respect to the surface of the metal sheet for containers were measured. Therefore, three numerical expressions could be obtained, and thus the dispersive force component, the dipolar component, and the hydrogen bond component of a solid (the surface of the metal sheet for containers) were computed by solving this equation. The dipolar component of the solid obtained as described above was used as the dipole-dipole force of the surface of the metal sheet for containers.

In a case in which the hydrogen bond force is employed as an index regarding the polarity of the surface of the laminate film, numerical values are extremely small, and it is also difficult to clarify the difference in the easiness of content release from the viewpoint of measurement errors.

Next, the present inventors investigated a relationship between the degree of the dipole-dipole force and the easiness of content release from a container for food. The results are illustrated in FIG. 1.

The easiness of content release (meat release properties) was evaluated as described below. First, can bodies were produced using metal sheets for containers having different dipole-dipole forces respectively. The can bodies were filled with salmon fillets so that the salmon skin was closely attached to the can wall, and lids were fastened. A retort treatment was carried out in a state in which the lids of the cans faced downwards, then, the cans were turned over so that the lids of the cans faced upwards, and the lids were removed. The adhesion state of the salmon skin to the can wall was evaluated in the content release, and a can to which the salmon skin did not adhere or rarely adhered was evaluated as "Good", and a can to which a few or a majority of the salmon skin adhered was evaluated as "No Good".

As illustrated in FIG. 1, the present inventors found that, when the dipole-dipole force is 40 mN/m or less, the easiness of content release is excellent.

Next, means for setting the dipole-dipole force of the film after lamination to 40 mN/m or less was studied. As a result, it was found that, as illustrated in FIG. 2, the dipole-dipole force can be set to 40 mN/m or less by controlling Tr that is the temperature (unit: ° C.) of a lamination roll and a time t taken from the end of a laminating step to the start of a cooling step when a polyester film containing 0.010 to 2.000 mass % of a wax in terms of the mass ratio is laminated on a metal sheet.

Figure 2:
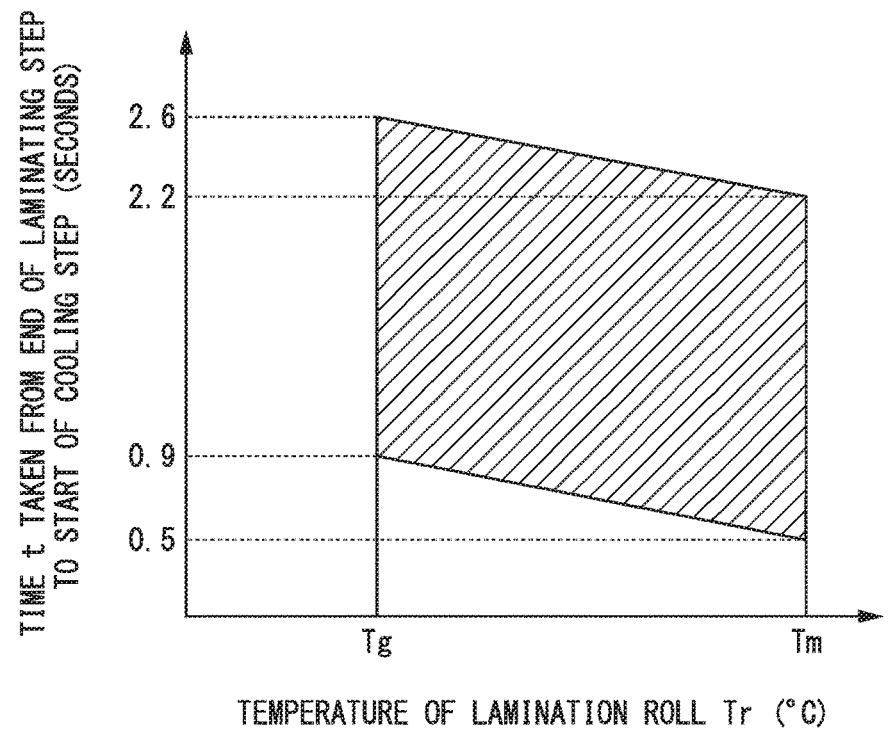
FIG. 2 is an explanatory view illustrating a temperature of a lamination roll for obtaining a preferred dipole-dipole force and a time t taken from the end of a laminating step to the start of a cooling step.

In FIG. 2, a range in which the dipole-dipole force is 40 mN/m or less is indicated by hatched lines.

That is, the temperature Tr (unit: ° C.) of the lamination roll needs to be equal to or higher than a glass transition temperature Tg (unit: ° C.) of a polyester film 3 and equal to or lower than the melting point Tm (unit: ° C.) of a wax included in the polyester film 3, and the time t (unit: seconds) taken from the end of the laminating step to the start of the cooling step needs to satisfy Expression (2).

$$0.9 - \{0.4/(Tm-Tg)\} \times (Tr-Tg) \leq t \leq 2.6 - \{0.4/(Tm-Tg)\} \times (Tr-Tg) \quad (2)$$

The reason for the dipole-dipole force of the film being suppressed to 40 mN/m or less by controlling the temperature Tr (unit: ° C.) of the lamination roll and the time t taken from the end of the laminating step to the start of the cooling step as described above can be considered as described below. When the temperature Tr (unit: ° C.) of the lamination roll and the time t taken from the end of the laminating step to the start of the cooling step are controlled as described above, the wax preferably melts, and the molten wax floats out on the surface of the polyester film 3 (hereinafter, this phenomenon will be referred to as the bleed-out phenomenon in some cases).

Wax does not have any hydrogen atoms that are covalently bonded to electrically negative atoms. Therefore, in a state in which the wax floats out on the surface of the polyester film 3, the polarity of the surface of the polyester film 3 decreases. Therefore, the dipole-dipole force of the polyester film 3 is considered to decrease to 40 mN/m or less.

The present invention has been made on the basis of the above-described finding. Hereinafter, a metal sheet for containers and a method for manufacturing a metal sheet for containers according to an embodiment will be described with reference to drawings.

<Metal Sheet for Containers 10>

Figure 3:
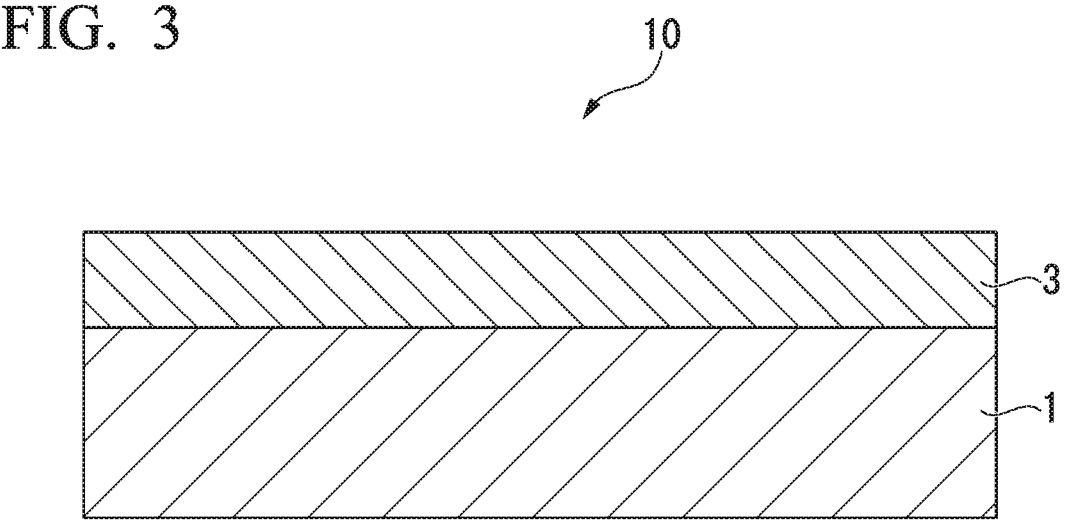
FIG. 3 is a configurational view of a metal sheet for containers having a polyester film on a surface of the metal sheet which is scheduled to be an inner surface side of containers.
Figure 4:
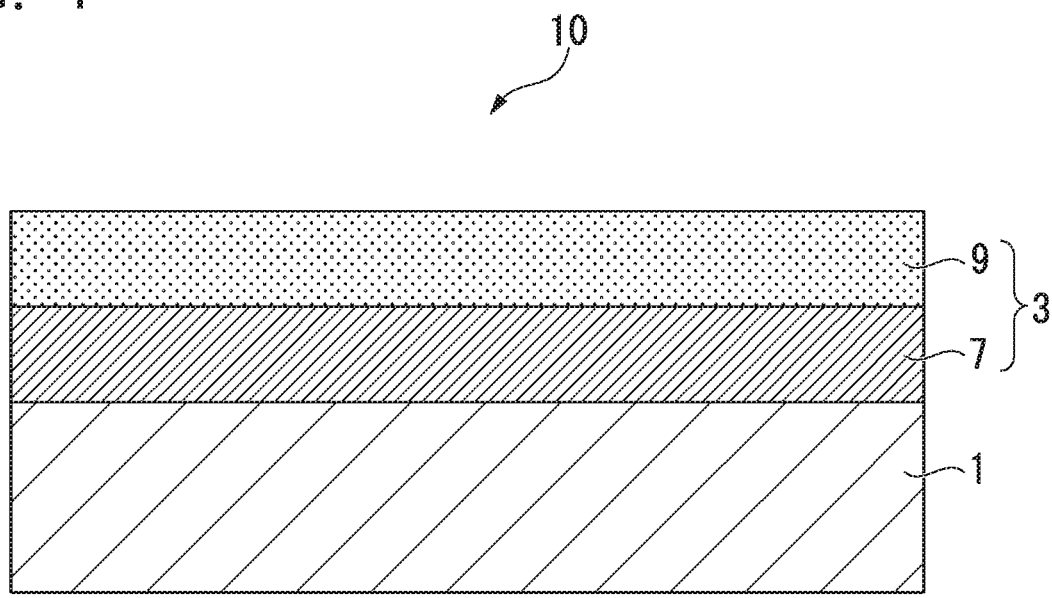
FIG. 4 is a configurational view of the metal sheet for containers having the polyester film made up of two layers of a layer (A layer) on a metal sheet side and a layer (B layer) which is a top layer after lamination on the surface of the metal sheet which is scheduled to be the inner surface side of containers.
Figure 5:
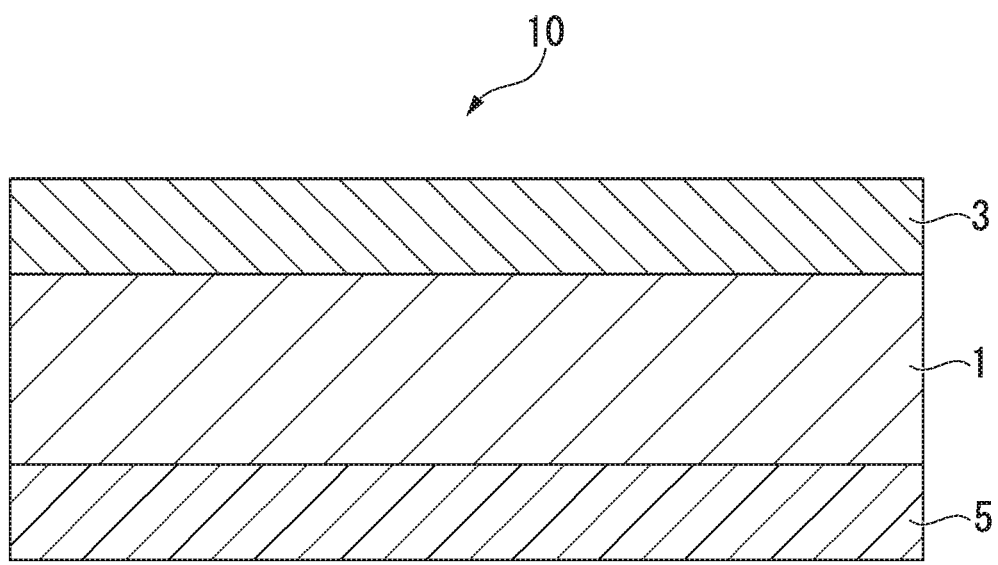
FIG. 5 is a configurational view of the metal sheet for containers having the polyester film on the surface of the metal sheet which is scheduled to be the inner surface side of containers and having a polyester film on a surface of the metal sheet which is scheduled to be an outer surface side of containers.
Figure 6:
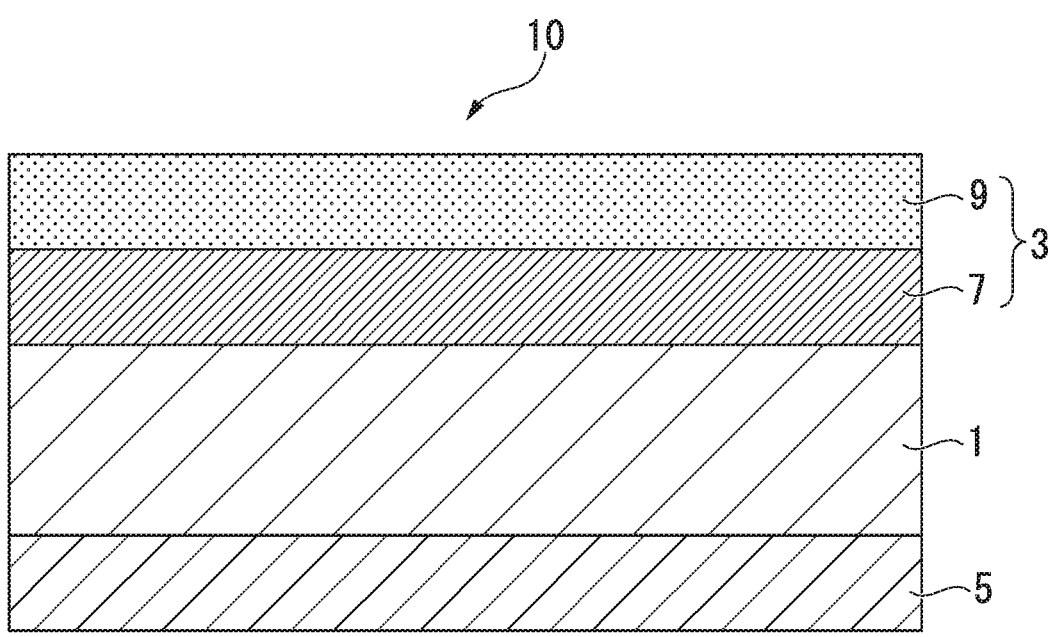
FIG. 6 is a configurational view of the metal sheet for containers having the polyester film made up of two layers of the layer (A layer) on the metal sheet side and the layer (B layer) which is the top layer after lamination on the surface of the metal sheet which is scheduled to be the inner surface side of containers and having the polyester film on the surface of the metal sheet which is scheduled to be the outer surface side of containers.

FIG. 3 is a configurational view of a metal sheet for containers 10 having the polyester film 3 on a surface of a metal sheet 1 which is scheduled to be an inner surface side of containers. FIG. 4 is a configurational view of the metal sheet for containers 10 having the polyester film 3 made up of two layers of a layer (A layer) 7 on a metal sheet side and a layer (B layer) 9 which is a top layer after lamination on the surface of the metal sheet 1 which is scheduled to be the inner surface side of containers. FIG. 5 is a configurational view of the metal sheet for containers 10 having the polyester film 3 on the surface of the metal sheet 1 which is scheduled to be the inner surface side of containers and having a polyester film 5 on a surface of the metal sheet 1 which is scheduled to be an outer surface side of containers. FIG. 6 is a configurational view of the metal sheet for containers 10 having the polyester film 3 made up of two layers of the layer (A layer) 7 on the metal sheet side and the layer (B layer) 9 which is the top layer after lamination on the surface of the metal sheet 1 which is scheduled to be the inner surface side of containers and having the polyester film 5 on the surface of the metal sheet 1 which is scheduled to be the outer surface side of containers.

Figure 7:
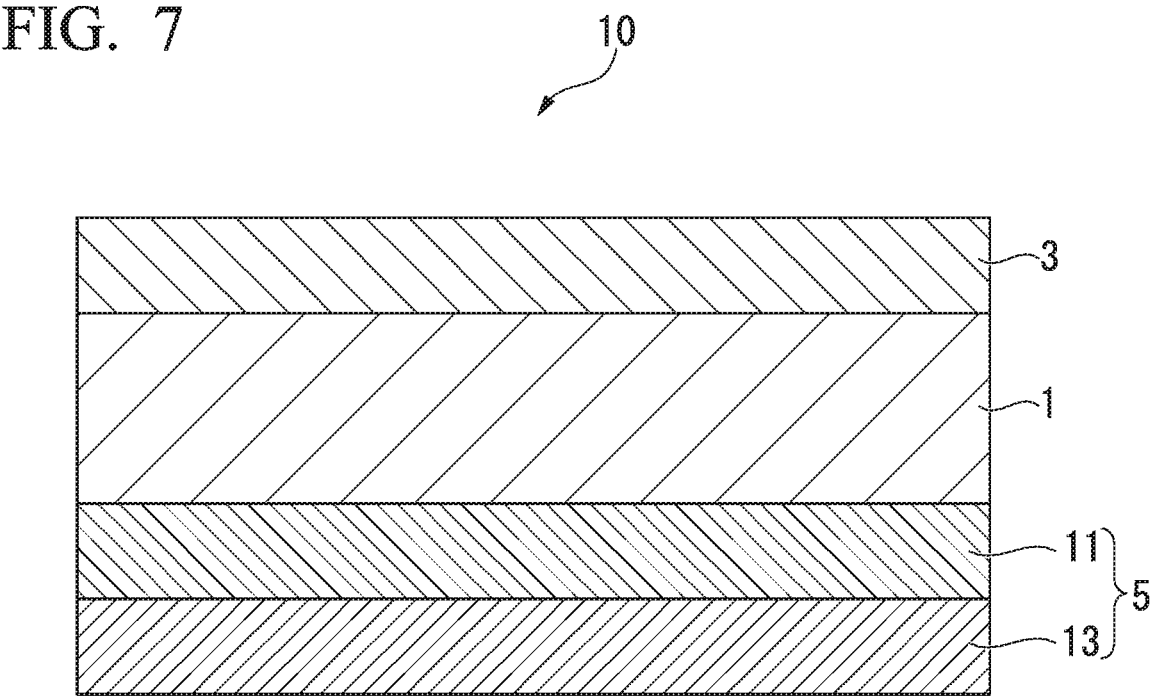
FIG. 7 is a configurational view of the metal sheet for containers having the polyester film on the surface of the metal sheet which is scheduled to be the inner surface side of containers and having a polyester film made up of two layers of a layer (C layer) on a metal sheet side and a layer (D layer) which is a top layer after lamination on the surface of the metal sheet which is scheduled to be the outer surface side of containers.
Figure 8:
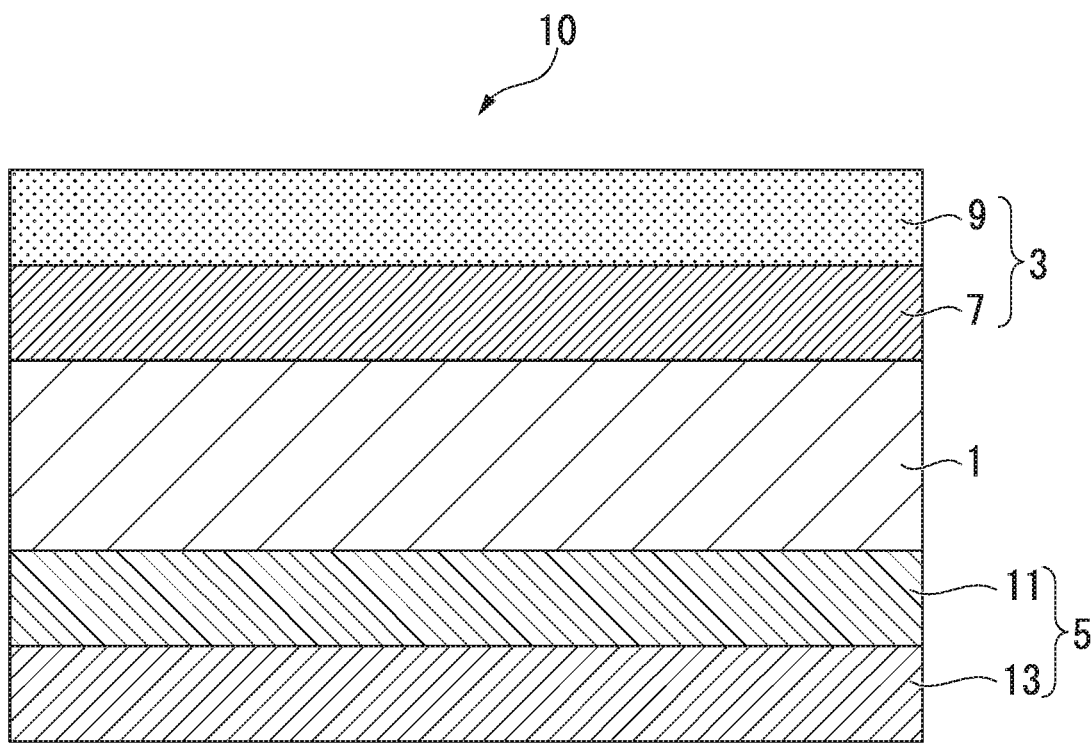
FIG. 8 is a configurational view of the metal sheet for containers having the polyester film made up of two layers of the layer (A layer) on the metal sheet side and the layer (B layer) which is the top layer after lamination on the surface of the metal sheet which is scheduled to be the inner surface side of containers and having the polyester film made up of two layers of the layer (C layer) on the metal sheet side and the layer (D layer) which is the top layer after lamination on the surface of the metal sheet which is scheduled to be the outer surface side of containers.

FIG. 7 is a configurational view of the metal sheet for containers 10 having the polyester film 3 on the surface of the metal sheet 1 which is scheduled to be the inner surface side of containers and having the polyester film 5 made up of two layers of a layer (C layer) 11 on the metal sheet side and a layer (D layer) 13 which is a top layer after lamination on the surface of the metal sheet 1 which is scheduled to be the outer surface side of containers. FIG. 8 is a configurational view of the metal sheet for containers 10 having the polyester film 3 made up of two layers of the layer (A layer) 7 on the metal sheet side and the layer (B layer) 9 which is the top layer after lamination on the surface of the metal sheet 1 which is scheduled to be the inner surface side of containers and having the polyester film 5 made up of two layers of the layer (C layer) 11 on the metal sheet side and the layer (D layer) 13 which is the top layer after lamination on the surface of the metal sheet 1 which is scheduled to be the outer surface side of containers.

As illustrated in FIG. 3, the metal sheet for containers 10 includes the metal sheet 1 and the polyester film 3 which is laminated on the surface of the metal sheet 1 which is scheduled to be the inner surface side of containers and the polyester film contains a wax in an amount of 0.010 to 2.000 mass %, and has a dipole-dipole force of 40 mN/m or less.

<Metal Sheet 1>

As the metal sheet 1, it is possible to use a mild steel sheet, an aluminum sheet, or the like which is broadly used as a material for a can. A surface treatment may be carried out on the metal sheet 1, and, for example, a surface treatment using metallic chromium or hydrated chromium oxide may be carried out. The adhesion amount of metallic chromium or hydrated chromium oxide is not particularly limited; however, from the viewpoint of adhesion after processing and corrosion resistance, it is desirable to set the adhesion amount of metallic chromium to 40 to 500 mg/m$^2$ and the adhesion amount of hydrated chromium oxide to 8 to 20 mg/m$^2$ in terms of chromium.

The metal sheet 1 is preferably so-called chromium plated tinfree steel (TFS) which does not contain Sn.

<Polyester Film 3>

The metal sheet for containers 10 has the polyester film 3 which contains a wax in an amount of 0.010 to 2.000 mass % and has a surface dipole-dipole force of 40 mN/m or less on the surface of the metal sheet 1 to be the inner surface side of containers.

Polyester is a resin made up of a dicarboxylic acid component and a glycol component.

Examples of the dicarboxylic acid component include aromatic dicarboxylic acids such as terephthalic acid, isophthalic acid, naphthalenedicarboxylic acid, diphenyldicarboxylic acid, 5-sodium sulfoisophthalic acid, and phthalic acid, aliphatic dicarboxylic acids such as oxalic acid, succinic acid, adipic acid, sebacic acid, dimer acid, maleic acid, and fumaric acid, alicyclic dicarboxylic acids such as cyclohexane dicarboxylic acid, oxycarboxylic acids such as p-oxybenzoic acid, and the like. Among these, terephthalic acid is preferred from the viewpoint of a heat resisting property and a taste characteristic.

Examples of the glycol component include aliphatic glycols such as ethylene glycol, propanediol, butanediol, pentanediol, hexanediol, and neopentyl glycol, alicyclic glycols such as cyclohexanedimethanol, aromatic glycols such as bisphenol A and bisphenol S, and the like. Among these, ethylene glycol is preferred.

Two or more kinds of the dicarboxylic acid components and the glycol components may be jointly used. In addition, a polyfunctional compound such as trimethic acid, trimesic acid, or trimethylolpropane may be copolymerized with the polyester film 3 as long as the effects of the present embodiment are not impaired.

In addition, it is possible to blend a heat stabilizer, an antioxidant, an ultraviolet absorbent, a plasticizer, a pigment, a dye, an antistatic agent, a crystal nucleating agent, and the like to the polyester as necessary. Examples of the heat stabilizer include an antimony compound, a germanium compound, a titanium compound, a phosphorus compound, and the like. In a case in which the polyester contains a germanium compound, the taste characteristic becomes favorable after the polyester was subjected to a high-temperature thermal history such as drying or a retort treatment in a can-producing step. In a case in which the polyester contains an antimony compound, it is possible to decrease the amount of diethylene glycol which is produced as a byproduct, and thus the heat resisting property becomes favorable.

In order to set the dipole-dipole force of the polyester film 3 after lamination in a range described below, a wax in an amount of 0.010 to 2.000% in terms of mass ratio is added to the polyester film 3.

As the wax, an organic or inorganic lubricant can be used, and any one or more of a polyethylene wax, a polypropylene wax, and sodium stearate are preferred. When the melting point of the wax is too low, the wax excessively melts due to heat generated during lamination, and the molten wax adheres to a roll. Therefore, the manufacturability of the metal sheet for containers 10 degrades, which is not preferable.

After the metal sheet for containers 10 is processed to a container for food and filled with a content, a retort treatment is carried out for sterilization. When the melting point of the wax is too low, the wax is likely to be eluted into the content during the retort treatment, and it becomes difficult to ensure a non-adhesion property and a mold release property, which is not preferable.

As a wax that does not cause the above-described problems, a polyethylene wax is particularly preferred. Particularly, a polyethylene wax having a density of 0.93 g/cm$^3$ or more is preferred since the melting point is high and the addition amount can be decreased.

From the viewpoint of the easiness of content release, the dipole-dipole force of the polyester film 3 after lamination needs to be 40 mN/m or less. In a case in which the dipole-dipole force of the polyester film 3 after lamination exceeds 40 mN/m, the easiness of content release deteriorates, which is not preferable.

As long as the dipole-dipole force of the film after lamination satisfies 40 mN/m or less, the lower limit is not particularly specified; however, in the case of measuring a number of films, the lower limit of the measurement value is approximately 20 mN/m.

The dipole-dipole force is an intrinsic property of a substance and is not a property that is determined by a relationship with another substance.

The polyester film 3 can be manufactured using an ordinary film-forming method after a predetermined amount of the wax is blended into the polyester.

For example, the polyester film 3 can be manufactured as described below. First, a polyester resin and a predetermined amount of the wax are injected into a melt extruder in which the barrel temperature is set to a temperature that is higher than the melting point of the polyester resin by 20° C. or more, and the raw materials are melted and extruded. The polyester resin extruded so as to obtain a predetermined thickness is cooled and solidified using a casting drum, whereby the polyester film 3 can be formed.

The polyester film 3 may be a single-layer film made of a single layer alone or a laminate film including at least two layers of a layer (A layer) 7 on a metal sheet side and a layer (B layer) 9 which is a top layer on the inner surface side of containers after lamination.

In order to manufacture the laminate film, the respective layers need to be attached together. As a method therefor, an ordinary method such as a dry, wet, or extrusion lamination method is employed, and, as necessary, an adhesive is used or a corona discharge treatment and an oxidation treatment are carried out.

In a case in which the polyester film 3 is a laminate film, at least the layer (B layer) 9 which is the top layer on the inner surface side of containers after lamination needs to contain the wax.

In a case in which the polyester film 3 is a laminate film, it is preferable that the layer (B layer) 9 which is the top layer on the inner surface side of containers after lamination contains at least one of polyethylene terephthalate and polyethylene naphthalate and the total amount of the polyethylene terephthalate and the polyethylene naphthalate is 80 mol % or more of polyester configuring the layer (B layer) 9 which is the top layer on the inner surface side of containers after lamination. In such a case, good impact resistance can be obtained.

In a case in which the polyester film 3 is a laminate film, the amount of polybutylene terephthalate in the layer (A layer) 7 on the metal sheet side is preferably 5 to 80 mol % of polyester included in this layer.

As illustrated in FIG. 5 and FIG. 6, the metal sheet for containers 10 may have the polyester film 5 having a crystallization temperature of 120° C. or lower on the surface of the metal sheet 1 which is scheduled to be the outer surface side of containers.

When the metal sheet for containers 10 has the polyester film 5 on the surface of the metal sheet 1 which is scheduled to be the outer surface side of containers, the surface external appearance of the container for food after the retort treatment becomes preferable.

In the retort treatment that is carried out as a sterilization treatment after the filling of the container for food with the content, the container for food is left to stand in a hot and humid state of 120° C. to 130° C. for approximately one to two hours. At this time, the polyester film locally crystallizes, and thus parts thereof become opaque. As a result, a spotted shape of a transparent external appearance and an opaque external appearance is formed, and the surface external appearance significantly degrades.

In order to avoid the above-described phenomenon, it is effective to uniformly crystallize the film in the retort treatment. Therefore, the crystallization temperature of the polyester film 5 is preferably 120° C. or lower.

The crystallization temperature of the film is obtained from an endothermic peak that is generated by phase transition during the cooling of the film at a rate of 10° C./min in a differential scanning calorimeter. In a case in which the film has multiple layers, the crystallization temperature is the average of the crystallization temperature of all of the layers.

As illustrated in FIG. 7 and FIG. 8, the polyester film 5 may be a laminate film having at least two layers of the layer (C layer) 11 on the metal sheet side and the layer (D layer) 13 which is the top layer on the outer surface side of containers after lamination.

In this case, it is preferable that the layer (C layer) 11 on the metal sheet side contains polybutylene terephthalate and 5 to 80 mol % of polyester included in the layer (C layer) 11 on the metal sheet side is polybutylene terephthalate. In such a case, it becomes easy to control the crystallization temperature of the polyester film 5 to 120° C. or lower, and it becomes possible to improve the formability of the polyester film 5.

Polybutylene terephthalate has a low crystallization temperature and is easily crystallized. Therefore, in a case in which more than 80 mol % of polyester included in the polyester film 5 is polybutylene terephthalate, the formability of the polyester film 5 after lamination degrades, which is not preferable. On the other hand, when the amount of the polybutylene terephthalate is less than 5 mol %, the crystallization temperature of the polyester film 5 does not sufficiently decreases, which is not preferable.

Furthermore, a more preferred amount of the polybutylene terephthalate is 30 to 70 mol %.

In a case in which the polyester film 5 is a laminate film having at least two layers of the layer (C layer) 11 on the metal sheet side and the layer (D layer) 13 which is the top layer on the outer surface side of containers after lamination, it is preferable that the layer (D layer) 13 which is the top layer on the outer surface side of containers after lamination contains at least one of polyethylene terephthalate and polyethylene naphthalate, the total amount of the polyethylene terephthalate and the polyethylene naphthalate in the layer (D layer) 13 which is the top layer on the outer surface side of containers after lamination is 80 mol % or more of polyester included in the layer (D layer) 13 which is the top layer on the outer surface side of containers after lamination. In such a case, it is possible to improve the impact resistance of the polyester film 5.

In a case in which the metal sheet is used for containers for food, designability is one of important characteristics. In order to obtain a preferable designability, it is possible to add a colorant to the polyester film.

As the colorant, there are a pigment and a dye. As the pigment, aluminium powder, bronze powder, zinc powder, mica powder, titanium oxide, zinc oxide, zinc sulfide, and the like can be used. In addition, as the dye, an azo-based dye, an anthraquinone-based dye, an indigo-based dye, and the like can be used.

<Method for Manufacturing Metal Sheet for Containers 10>

Next, a method for manufacturing the metal sheet for containers 10 will be described.

The method for manufacturing the metal sheet for containers 10 has a laminating step of passing the metal sheet 1 and the polyester film 3 through a pair of lamination rolls (not illustrated) to laminate the polyester film 3 on the surface of the metal sheet 1 which is scheduled to be the inner surface side of containers and a cooling step of cooling the metal sheet 1 having the polyester film 3 laminated on the surface which is scheduled to be the inner surface side of containers after the laminating step.

<Laminating Step>

In the manufacturing of the metal sheet for containers 10, first, the metal sheet 1 and the polyester film 3 are caused to pass through a pair of lamination rolls (not illustrated) in a sandwiched state to laminate the polyester film 3 on the surface of the metal sheet 1 which is scheduled to be the inner surface side of containers.

In a case in which the polyester film 5 is laminated on the surface of the metal sheet 1 which is scheduled to be the outer surface side of containers, the polyester film 5 is transported from a side opposite to the polyester film 3, and the metal sheet 1, the polyester film 3, and the polyester film 5 are caused to pass through a pair of lamination rolls in a sandwiched state.

In the laminating step, Tr (unit: ° C.) that is the temperature of the pair of lamination rolls (not illustrated) is equal to or higher than Tg (unit: ° C.) that is the glass transition temperature of the polyester film 3 and equal to or lower than Tm (unit: ° C.) that is the melting point of the wax.

That is, Tr that is the temperature of the pair of lamination rolls (not illustrated) satisfies Expression (3).

$$Tg \leq Tr \leq Tm \tag{3}$$

In a case in which Tr (unit: ° C.) that is the temperature of the lamination rolls (not illustrated) is lower than Tg (unit: ° C.) that is the glass transition temperature of the polyester film 3, the wax does not preferably float out on the surface of the polyester film 3. Therefore, the dipole-dipole force of the polyester film 3 becomes more than 40 mN/m, and the easiness of content release degrades, which is not preferable.

On the other hand, in a case in which Tr (unit: ° C.) that is the temperature of the lamination rolls is higher than Tm (unit: ° C.) that is the melting point of the wax in the polyester film 3, the dipole-dipole force of the polyester film 3 becomes more than 40 mN/m, and the easiness of content release degrades, which is not preferable. In addition, the wax included in the polyester film 3 adheres to a compression roll during lamination, and the productivity degrades, which is not preferable.

In the lamination of the film on the metal sheet, when there is a large amount of a foreign substance in the atmosphere, the foreign substance intrudes into the interface between the film and the metal sheet and becomes a cause for the generation of film defects during a can-producing process, and thus the cleanness of the atmosphere is desirably set to a cleanliness class of 10,000 or less.

<Time Taken from End of Laminating Step to Start of Cooling Step>

In the manufacturing of the metal sheet for containers 10, t (unit: seconds) that is the time taken from the end of the laminating step to the start of the cooling step satisfies Expression (4).

$$0.9-\{0.4/(Tm-Tg)\}\times(Tr-Tg) \leq t \leq 2.6-\{0.4/(Tm-Tg)\}\times(Tr-Tg) \quad (4)$$

In a case in which the time t (unit: seconds) is longer than the upper limit of Expression (4), the resin in the polyester film 3 forms spherocrystals, and the adhesion of the polyester film 3 to the metal sheet 1 degrades, which is not preferable. In a case in which the time t (unit: seconds) is shorter than the lower limit of Expression (4), the wax included in the polyester film 3 does not bleed out, the dipole-dipole force becomes more than 40 mN/m, and the easiness of content release becomes insufficient, which is not preferable.

In the manufacturing of the metal sheet for containers 10, Expression (4) is computed in advance using a metal sheet for containers of a sample having a dipole-dipole force of 40 mN/m or less. The fact that Expression (4) is not satisfied may be additionally confirmed using the metal sheet for containers of the sample having a dipole-dipole force of 40 mN/m or more.

In a case in which the polyester film 3 includes a plurality of waxes, the time t (unit: seconds) needs to satisfy Expression (4) when Tm (unit: °C.) that is the melting point of a wax having a lower melting point is assigned to Expression (4).

The glass transition temperature of the polyester film 3 is computed on the basis of an endothermic peak measured using a differential scanning calorimeter. In a case in which the polyester film 3 is a laminate film, the endothermic peak is not measured for each layer, and the endothermic peak is measured for the entire polyester film 3. In a case in which the polyester film 3 is a laminate film, the width of an endothermic peak being measured is broad, but the glass transition temperature is computed using the peak temperature therein.

<Cooling Step>

The method for manufacturing the metal sheet for containers 10 has a cooling step of cooling the metal sheet 1 having the polyester film 3 laminated on the surface which is scheduled to be the inner surface side of containers after the laminating step.

A cooling method in the cooling step is not particularly limited, but a method of immersing the metal sheet 1 laminated with the polyester film 3 (and the polyester film 5) in a cooling tank including water, a method of spraying water to the metal sheet 1 laminated with the polyester film 3 (and the polyester film 5), and the like are exemplified.

A method for measuring the temperature Tr (unit: °C.) of the pair of lamination rolls (not illustrated) is not particularly limited, and a method of measuring the temperature using a non-contact thermometer (for example, a radiation-type thermometer), a contact thermometer (for example, a rotary roll temperature sensor), or the like is exemplified.

Meanwhile, t (unit: seconds) that is the time taken from the end of the laminating step to the start of the cooling step may be controlled by changing the sheet passing speed. In the case of controlling the time t using the sheet passing speed, a range of the sheet passing speed which satisfies the condition of the time t is obtained in advance on the basis of the length of a line, and whether or not the sheet passing speed satisfies the range is determined. In addition, whether or not Expression (4) is satisfied may also be determined by directly measuring the time t.

The time of ending the laminating step is a time at which the lamination of the polyester film 3 on the surface of the metal sheet 1 which is scheduled to be the inner surface side of containers ends. In addition, the time of starting the cooling step is a time at which the cooling of the metal sheet 1 in which the polyester film 3 is laminated on the surface which is scheduled to be the inner surface side of containers starts. For example, in the case of cooling the metal sheet using a cooling tank, the time of starting the cooling step is a time of starting the immersion of the metal sheet 1 laminated with the polyester film 3 on the surface which is scheduled to be the inner surface side of containers in the cooling tank.

Whether or not the measured Tr satisfies Expression (3) is determined. In a case in which the measured Tr is determined to fail to satisfy Expression (3), the temperature of the lamination rolls is controlled so that Tr satisfies Expression (3).

Similarly, whether or not the measured time t satisfies Expression (4) is determined. In a case in which the measured time t is determined to fail to satisfy Expression (4), the time t is controlled in the laminating step and the cooling step so as to satisfy Expression (4). A subject that is controlled to make the time t satisfy Expression (4) is not particularly limited, and examples thereof include a method for controlling the sheet passing speed and the like.

As described above, when the time t and the temperature Tr of the lamination rolls are controlled, it is possible to obtain a metal sheet for containers in which the dipole-dipole force of the film reaches 40 mN/m or less after lamination and the property of content release is excellent.

EXAMPLES

Hereinafter, examples of the present invention will be described.

A 0.18 mm-thick tin mill black plate was defatted, pickled, and plated with chromium, thereby manufacturing a chromium-plated steel sheet.

The chromium plating was carried out as described below. First, chromium plating was carried out in a chromium plating bath including chromic anhydride and a fluoride. An intermediate rinse was carried out, and then an electrolytic treatment was carried out using a chemical conversion treatment liquid including chromic anhydride and a fluoride. At this time, the conditions of the electrolytic treatment were adjusted, thereby setting the adhesion amount of metallic chromium to 100 mg/m$^2$ and the amount of hydrated chromium oxide to 12 mg/m$^2$.

A polyester film (total thickness: 20 µm) and a polyester film (total thickness: 12 µm) were laminated on a surface of the chromium-plated steel sheet that had been heated to a temperature that was 30° C. higher than the melting point of the polyester film laminated on a surface that was on an inner surface side of containers. The polyester film (total thickness: 20 μm) and the polyester film (total thickness: 12 μm) were laminated on a surface on the inner surface side of containers and on a surface that is on an outer surface side of containers respectively. After that, the polyester films were cooled by water cooling (by being immersed in a cooling tank), thereby producing a laminate steel sheet.

Resin compositions and thicknesses thereof and wax components and addition amounts thereof which were used in examples and comparative examples and conditions during the lamination (lamination roll temperatures and times taken until the water cooling after the lamination) are shown in tables. The addition amounts of waxes in Table 1-1-1 to Table 1-1-4 and Table 2-1-1 to Table 2-1-4 are indicated by "mass %" with respect to the total mass of the polyester film formed on the surface that was on the inner surface side of containers.

Film performance after lamination and steel sheet performance of the laminated metal sheets were evaluated using methods described below.

<Dipole-Dipole Force of Polyester Film>

The dipole-dipole force of the polyester film formed on the surface that was on the inner surface side of containers was computed by measuring individual contact angles of the polyester film formed on the surface that was on the inner surface side of containers with respect to hexadecane, methylene iodide, and water.

Specifically, the dipole-dipole force of the polyester film formed on the surface that was on the inner surface side of containers was computed as described below. First, individual solutions of hexadecane, methylene iodide, and water were added dropwise as much as 2 μl onto the polyester film formed on the surface that was on the inner surface side of containers. The contact angles after one second from the dropwise addition were measured using a CA-DT-type contact angle meter manufactured by Kyowa Interface Science Co., Ltd. Values of the three contact angles measured as described above were assigned to Young, Dupre, and extended Fowkes' solid surface tension three-chemical composition-system expression and the simultaneous equation was solved, thereby computing the dipole-dipole force of the polyester film formed on the surface that was on the inner surface side of containers.

A case in which the dipole-dipole force was 40 mN/m or less was considered as pass.

Dipole-dipole forces in Table 1-3 and Table 2-3 indicate the dipole-dipole forces of the polyester films that were formed on the surfaces that were on the inner surface side of containers.

<Crystallization Temperature of Polyester Film Formed on Surface on Outer Surface Side of Containers>

When the crystallization temperature of the polyester film formed on the surface that was on the outer surface side of containers was measured, first, a defect reaching a base metal from the surface of the polyester film formed on the surface that was on the inner surface side of containers was produced using a retractable knife. The width of the defect was approximately 1 to 3 mm. After the defect was produced on the polyester film side that was formed on the surface that was on the inner surface side of containers, the laminate steel sheet was immersed in an aqueous solution of 5% hydrochloric acid, thereby dissolving the steel sheet. When the steel sheet was dissolved, the polyester film formed on the surface that was on the inner surface side of containers and the polyester film formed on the surface that was on the outer surface side of containers were obtained; however, due to the previously-produced defect, the polyester film formed on the surface that was on the inner surface side of containers became fine. Therefore, between the obtained films, the film having a larger size was the polyester film formed on the surface that was on the outer surface side of containers, and thus the film having a larger size was sampled.

The sampled polyester film was stored and dried in a desiccator in which nitrogen flew for 24 hours, thereby producing a dried film. A sample (10 mg) was sampled from the dried film, and the temperature was increased by heating at a rate of 10° C./min. An endothermic peak generated by crystallization was measured using a differential scanning calorimeter (SSC5300 manufactured by Seiko Instruments Inc.), thereby obtaining the crystallization temperature. In a case in which the film had multiple layers, a multilayer film was prepared as a measurement sample, and the endothermic peak was measured using the differential scanning calorimeter in the same manner as described above.

<Glass Transition Temperature of Polyester Film Formed on Surface on Inner Surface Side of Containers>

First, a dried film (10 mg) was prepared using the above-described method. Meanwhile, when the glass transition temperature of the polyester film formed on the surface that was on the inner surface side of containers was measured, a defect was produced from the surface to the base metal of the polyester film formed on the surface that was on the outer surface side of containers, and the laminate steel sheet was immersed in an aqueous solution of 5% hydrochloric acid.

Next, the sample was cooled using the differential scanning calorimeter (SSC5300 manufactured by Seiko Instruments Inc.). The glass transition temperature of the polyester film formed on the surface that was on the inner surface side of containers was evaluated from an endothermic peak generated by phase transition during the cooling.

<Content Release Properties (Meat Release Properties)>

Two stages of drawing were carried out using a laminate metal sheet of 160 mmϕ obtained by punching, thereby forming a can having an inner diameter of 87 mm. The can was trimmed so that the width of a flange portion of the formed can reached 2.5 mm and filled with salmon fillets so that the salmon skin was closely attached to an inner wall of the can. A lid was fastened, and then a retort treatment was carried out at a temperature of 125° C. for 90 minutes in a state in which the lid faced downwards.

After that, the lid was removed in a state in which the lid faced upwards, the content was released, and then the content release properties was evaluated from the adhesion state of the salmon skin to the inner wall of the can.

A case in which the salmon skin did not adhere or rarely adhered to the can was evaluated as "Good", and a case in which a few or a majority of the salmon skin adhered the can and remained was evaluated as "Bad".

<Film Surface External Appearance on can Outer Surface Side>

Two stages of drawing were carried out using a laminate metal sheet of 160 mmϕ obtained by punching, thereby forming a can having an inner diameter of 87 mm. The can was trimmed so that the width of a flange portion of the formed can reached 2.5 mm and filled with salmon fillets so that the salmon skin was closely attached to an inner wall of the can. A lid was fastened, and then a retort treatment was carried out at a temperature of 125° C. for 90 minutes in a state in which the lid faced downwards.

After that, the lid was removed in a state in which the lid faced upwards, and the content was released. After that, the surface external appearance of an outer surface of the can was visually evaluated.

A case in which no discoloration such as whitening was observed in the film was evaluated as "Very Good", a case in which discoloration such as whitening was locally observed in the film was evaluated as "Fair", and a case in which clear discoloration such as whitening was observed in a broad range of the film was evaluated as "Bad". Cases evaluated as "Very Good" or "Fair" were considered as pass.

<Formability>

Two stages of drawing were carried out using a laminate metal sheet of 160 mmϕ obtained by punching, thereby forming a can having an inner diameter of 87 mm. The can was trimmed so that the width of a flange portion of the formed can reached 2.5 mm, and damage of the film and the peeling of the film in the flange portion were visually observed.

A case in which damage or discoloration such as whitening did not occur in the film after forming and the film was not peeled off in the flange portion was evaluated as "Very Good", a case in which any one of damage or discoloration such as whitening and the peeling of the film occurred in the flange portion after forming was evaluated as "Fair", and a case in which damage or discoloration such as whitening occurred in the film after forming and the film was peeled off in the flange portion was evaluated as "Bad". Cases evaluated as "Very Good" or "Fair" were considered as pass.

<Film Adhesion>

Two stages of drawing were carried out using a laminate metal sheet of 160 mmϕ obtained by punching, thereby forming a can having an inner diameter of 87 mm. A sample for a peeling test (width: 14 mm, length: 50 mm) was cut out from a can barrel portion. The film was partially peeled off from the long side-side end portion of the cut-out sample on an inner surface side of the can, and a peeling test was carried out on the film in the peeled portion in a tension tester at a tensile rate of 20 mm/minute.

A case of 9.8 N/14 mm or more was evaluated as "Very Good", a case of 1.96 N/14 mm or more and less than 9.8 N/14 mm was evaluated as "Good", and a case of less than 1.96 N/14 mm was evaluated as "Bad". Cases evaluated as "Very Good" or "Good" were considered as pass.

<Impact Resistance>

Two stages of drawing were carried out using a laminate metal sheet of 160 mmϕ obtained by punching, thereby forming a can having an inner diameter of 87 mm. A sample for an impact resistance test (width: 50 mm, length: 50 mm) was cut out from the can barrel portion. A film surface on an inner surface side of the can and a 5 mm-thick silicon rubber were combined together using a Dupont impact tester, a punch having a front end diameter of 16 mm was placed on a film surface that was on an outer surface side of the can, and a 1 kg weight was dropped from a height of 40 mm, thereby carrying out an impact test. An end surface of the test sample was sealed with bees wax and insulated, then, a voltage of 6 V was applied between the test sample and a stainless steel sheet, and a current value after four seconds was scanned.

A case in which the current value was less than 0.01 mA was evaluated as "Very Good", a case in which the current value was 0.01 mA or more and less than 1 mA was evaluated as "Good", and a case in which the current value was 1 mA or more was evaluated as "Bad". Cases evaluated as "Very Good" or "Good" were considered as pass.

<Adhesion of Wax to Lamination Roll>

The presence or absence of an adhesion substance to the lamination roll during lamination was visually confirmed. In a case in which an adhesion substance was observed, the adhesion substance was analyzed using an infrared spectroscopic analysis, and whether or not the obtained peak was attributed to the wax was determined.

A case in which the wax component did not adhere to the lamination roll was evaluated as "Good", and a case in which the wax component adhered to the lamination roll was evaluated as "Bad". Cases evaluated as "Good" were considered as pass.

TABLE 1-1-1

| | Polyester film (inner surface side of containers) | | | | | | Properties | | | Polyester film (outer surface side of containers) | | | | Properties |
|---|---|---|---|---|---|---|---|---|---|---|---|---|---|---|
| | A layer (metal sheet side) | | B layer (surface layer) | | Wax | | Glass transition temperature of film Tg (°C) | Melting point of wax Tm (°C) | Single layer/ Multiple layers | C layer (metal sheet side) | | D layer (surface layer) | | Crystallization temperature (°C) |
| Single layer/ multiple layers | Type of resin | Layer thickness (μm) | Type of resin | Layer thickness (μm) | Type | Addition amount (%) | | | | Type of resin | Layer thickness (μm) | Type of resin | Layer thickness (μm) | |
| 1 Single layer | Isophthalic acid-modified polyethylene terephthalate: 12 mol %, polyethylene terephthalate: 88 mol % | 20 | | | Polyethylene wax | 1.000 | 68 | 110 | Multiple layers | Polyethylene terephthalate: 50 mol %, polybutylene terephthalate: 50 mol % | 10 | Polyethylene terephthalate: 100 mol % | 2 | 86 |
| 2 Single layer | Isophthalic acid-modified polyethylene terephthalate: 12 mol %, polyethylene terephthalate: 88 mol % | 20 | | | Polyethylene wax | 1.000 | 68 | 110 | Multiple layers | Polyethylene terephthalate: 50 mol %, polybutylene terephthalate: 50 mol % | 10 | Polyethylene terephthalate: 100 mol % | 2 | 86 |
| 3 Single layer | Isophthalic acid-modified polyethylene terephthalate: 12 mol %, polyethylene terephthalate: 88 mol % | 20 | | | Polyethylene wax | 0.010 | 68 | 110 | Multiple layers | Polyethylene terephthalate: 50 mol %, polybutylene terephthalate: 50 mol % | 10 | Polyethylene terephthalate: 100 mol % | 2 | 86 |
| 4 Single layer | Isophthalic acid-modified polyethylene terephthalate: 12 mol %, polyethylene terephthalate: 88 mol % | 20 | | | Polyethylene wax | 0.005 | 68 | 110 | Multiple layers | Polyethylene terephthalate: 50 mol %, polybutylene terephthalate: 50 mol % | 10 | Polyethylene terephthalate: 100 mol % | 2 | 86 |
| 5 Single layer | Isophthalic acid-modified polyethylene terephthalate: 12 mol %, polyethylene terephthalate: 88 mol % | 20 | | | None | 0 | 68 | — | Multiple layers | Polyethylene terephthalate: 50 mol %, polybutylene terephthalate: 50 mol % | 10 | Polyethylene terephthalate: 100 mol % | 2 | 86 |

TABLE 1-1-1-continued

| | Polyester film (inner surface side of containers) | | | | | | Properties | | | Polyester film (outer surface side of containers) | | | |
|---|---|---|---|---|---|---|---|---|---|---|---|---|---|
| | A layer (metal sheet side) | | B layer (surface layer) | | Wax | | | Glass transition temperature of film Tg (° C.) | Melting point of wax Tm (° C.) | Single layer/ Multiple layers | C layer (metal sheet side) | | D layer (surface layer) | |
| Single layer/ multiple layers | Type of resin | Layer thickness (μm) | Type of resin | Layer thickness (μm) | Type | Addition amount (%) | | | | Type of resin | Layer thickness (μm) | Type of resin | Layer thickness (μm) | Properties Crystallization temperature (° C.) |
| 6 Single layer | Polyethylene terephthalate: 100 mol % | 20 | | | None | 0 | 68 | — | Single layer | Isophthalic acid-modified polyethylene terephthalate: 12 mol %, polyethylene terephthalate: 88 mol % | 12 | | | 125 |

TABLE 1-1-2

| Single layer/ multiple layers | Polyester film (inner surface side of containers) ||||| Properties ||| Polyester film (outer surface side of containers) |||||
|---|---|---|---|---|---|---|---|---|---|---|---|---|---|
| | A layer (metal sheet side) || B layer (surface layer) ||| Wax || Glass transition temperature of film Tg (° C.) | Melting point of wax Tm (° C.) | Single layer/ multiple layers | C layer (metal sheet side) || D layer (surface layer) || Crystallization temperature (° C.) |
| | Type of resin | Layer thickness (μm) | Type of resin | Layer thickness (μm) | Type | Addition amount (%) | | | | Type of resin | Layer thickness (μm) | Type of resin | Layer thickness (μm) | |
| 7 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 2.000 | 68 | 110 | Multiple layers | Polyethylene terephthalate: 50 mol %, polybutylene terephthalate: 50 mol % | 10 | Polyethylene terephthalate: 100 mol % | 2 | 86 |
| 8 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 50 mol %, polybutylene terephthalate: 50 mol % | 10 | Polyethylene terephthalate: 100 mol % | 2 | 86 |
| 9 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 0.100 | 68 | 110 | Multiple layers | Polyethylene terephthalate: 50 mol %, polybutylene terephthalate: 50 mol % | 10 | Polyethylene terephthalate: 100 mol % | 2 | 86 |
| 10 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 0.050 | 68 | 110 | Multiple layers | Polyethylene terephthalate: 50 mol %, polybutylene terephthalate: 50 mol % | 10 | Polyethylene terephthalate: 100 mol % | 2 | 86 |

TABLE 1-1-2-continued

| Single layer/ multiple layers | Polyester film (inner surface side of containers) | | | | | | Properties | | | | Polyester film (outer surface side of containers) | | | | Properties |
|---|---|---|---|---|---|---|---|---|---|---|---|---|---|---|---|
| | A layer (metal sheet side) | | B layer (surface layer) | | Wax | | Glass transition temperature of film Tg (°C.) | Melting point of wax Tm (°C.) | Single layer/ multiple layers | | C layer (metal sheet side) | | D layer (surface layer) | | Crystallization temperature (°C.) |
| | Type of resin | Layer thickness (μm) | Type of resin | Layer thickness (μm) | Type | Addition amount (%) | | | | | Type of resin | Layer thickness (μm) | Type of resin | Layer thickness (μm) | |
| 11 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 0.010 | 68 | 110 | Multiple layers | | Polyethylene terephthalate: 50 mol %, polybutylene terephthalate: 50 mol % | 10 | Polyethylene terephthalate: 100 mol % | 2 | 86 |
| 12 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 0.005 | 68 | 110 | Multiple layers | | Polyethylene terephthalate: 50 mol %, polybutylene terephthalate: 50 mol % | 10 | Polyethylene terephthalate: 100 mol % | 2 | 86 |

TABLE 1-1-3

| | | Polyester film (inner surface side of containers) | | | | | | Properties | | | Polyester film (outer surface side of containers) | | | | Properties |
|---|---|---|---|---|---|---|---|---|---|---|---|---|---|---|---|
| | | A layer (metal sheet side) | | B layer (surface layer) | | Wax | | Glass transition temperature of film Tg (° C.) | Melting point of wax Tm (° C.) | Single layer/ multiple layers | C layer (metal sheet side) | | D layer (surface layer) | | Crystallization temperature (° C.) |
| Single layer/ multiple layers | | Type of resin | Layer thickness (μm) | Type of resin | Layer thickness (μm) | Type | Addition amount (%) | | | | Type of resin | Layer thickness (μm) | Type of resin | Layer thickness (μm) | |
| 13 | Multiple layers | Isophthalic acid-modified polyethylene terephthalate: 12 mol %, polyethylene terephthalate: 88 mol % | 17 | Polyethylene terephthalate: 100 mol % | 3 | None | 0 | 68 | — | Multiple layers | Polyethylene terephthalate: 50 mol %, polybutylene terephthalate: 50 mol % | 10 | Polyethylene terephthalate: 100 mol % | 2 | 86 |
| 14 | Single layers | Isophthalic acid-modified polyethylene terephthalate: 12 mol %, polyethylene terephthalate: 88 mol % | 20 | | | Polypropylene wax | 1.000 | 68 | 160 | Multiple layers | Polyethylene terephthalate: 50 mol %, polybutylene terephthalate: 50 mol % | 10 | Polyethylene terephthalate: 100 mol % | 2 | 86 |
| 15 | Single layer | Isophthalic acid-modified polyethylene terephthalate: 12 mol %, polyethylene terephthalate: 88 mol % | 20 | | | Sodium stearate | 1.000 | 68 | 100 | Multiple layers | Polyethylene terephthalate: 50 mol %, polybutylene terephthalate: 50 mol % | 10 | Polyethylene terephthalate: 100 mol % | 2 | 86 |
| 16 | Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Single layer | Polyethylene terephthalate: 50 mol %, polybutylene terephthalate: 50 mol % | 10 | | | 125 |
| 17 | Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 80 mol %, polybutylene terephthalate: 20 mol % | 10 | Polyethylene terephthalate: 100 mol % | 2 | 85 |

TABLE 1-1-3-continued

| Single layer/ multiple layers | Polyester film (inner surface side of containers) | | | | | | Properties | | | Polyester film (outer surface side of containers) | | | | Properties |
|---|---|---|---|---|---|---|---|---|---|---|---|---|---|---|
| | A layer (metal sheet side) | | B layer (surface layer) | | Wax | | Glass transition temperature of film Tg (° C.) | Melting point of wax Tm (° C.) | Single layer/ multiple layers | C layer (metal sheet side) | | D layer (surface layer) | | Crystallization temperature (° C.) |
| | Type of resin | Layer thickness (μm) | Type of resin | Layer thickness (μm) | Type | Addition amount (%) | | | | Type of resin | Layer thickness (μm) | Type of resin | Layer thickness (μm) | |
| 18 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 75 mol %, polybutylene terephthalate: 25 mol % | 10 | Polyethylene terephthalate: 100 mol % | 2 | 85 |

TABLE 1-1-4

| | | Polyester film (inner surface side of containers) | | | | | | Properties | | | Polyester film (outer surface side of containers) | | | | Properties |
|---|---|---|---|---|---|---|---|---|---|---|---|---|---|---|---|
| | | A layer (metal sheet side) | | B layer (surface layer) | | Wax | | | | | C layer (metal sheet side) | | D layer (surface layer) | | |
| Single layer/ multiple layers | | Type of resin | Layer thickness (μm) | Type of resin | Layer thickness (μm) | Type | Addition amount (%) | Glass transition temperature of film Tg (° C.) | Melting point of wax Tm (° C.) | Single layer/ multiple layers | Type of resin | Layer thickness (μm) | Type of resin | Layer thickness (μm) | Crystallization temperature (° C.) |
| 19 | Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 70 mol %, polybutylene terephthalate: 30 mol % | 10 | Polyethylene terephthalate: 100 mol % | 2 | 96 |
| 20 | Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 60 mol %, polybutylene terephthalate: 40 mol % | 10 | Polyethylene terephthalate: 100 mol % | 2 | 90 |
| 21 | Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 40 mol %, polybutylene terephthalate: 60 mol % | 10 | Polyethylene terephthalate: 100 mol % | 2 | 80 |
| 22 | Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 20 mol %, polybutylene terephthalate: 80 mol % | 10 | Polyethylene terephthalate: 100 mol % | 2 | 72 |

TABLE 1-1-4-continued

| | Polyester film (inner surface side of containers) | | | | | | Properties | | | Polyester film (outer surface side of containers) | | | | Properties |
|---|---|---|---|---|---|---|---|---|---|---|---|---|---|---|
| Single layer/ multiple layers | A layer (metal sheet side) | | B layer (surface layer) | | Wax | | Glass transition temperature of film Tg (° C.) | Melting point of wax Tm (° C.) | Single layer/ multiple layers | C layer (metal sheet side) | | D layer (surface layer) | | Crystallization temperature (° C.) |
| | Type of resin | Layer thickness (µm) | Type of resin | Layer thickness (µm) | Type | Addition amount (%) | | | | Type of resin | Layer thickness (µm) | Type of resin | Layer thickness (µm) | |
| 23 Multiple layers | Isophthalic acid- modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 97 mol %, polybutylene terephthalate: 3 mol % | 10 | Polyethylene terephthalate: 100 mol % | 2 | 122 |
| 24 Multiple layers | Isophthalic acid- modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 15 mol %, polybutylene terephthalate: 85 mol % | 10 | Polyethylene terephthalate: 100 mol % | 2 | 68 |

TABLE 1-2

| | Temperature of lamination roll Tr (° C.) | Time t taken from end of laminating step to start of cooling step (seconds) | 2.6 − {0.4/(Tm − Tg)} × (Tr − Tg) | 0.9 − {0.4/(Tm − Tg)} × (Tr − Tg) | Tr ≥ Tg | Tr ≤ Tm |
|---|---|---|---|---|---|---|
| 1 | 100 | 1.0 | 2.3 | 0.6 | Satisfied | Satisfied |
| 2 | 100 | 1.0 | 2.3 | 0.6 | Satisfied | Satisfied |
| 3 | 100 | 1.0 | 2.3 | 0.6 | Satisfied | Satisfied |
| 4 | 100 | 1.0 | 2.3 | 0.6 | Satisfied | Satisfied |
| 5 | 100 | 1.0 | (No wax contained, thus calculation impossible) | | | |
| 6 | 100 | 1.0 | (No wax contained, thus calculation impossible) | | | |
| 7 | 100 | 1.0 | 2.3 | 0.6 | Satisfied | Satisfied |
| 8 | 100 | 1.0 | 2.3 | 0.6 | Satisfied | Satisfied |
| 9 | 100 | 1.0 | 2.3 | 0.6 | Satisfied | Satisfied |
| 10 | 100 | 1.0 | 2.3 | 0.6 | Satisfied | Satisfied |
| 11 | 100 | 1.0 | 2.3 | 0.6 | Satisfied | Satisfied |
| 12 | 100 | 1.0 | 2.3 | 0.6 | Satisfied | Satisfied |
| 13 | 100 | 1.0 | (No wax contained, thus calculation impossible) | | | |
| 14 | 100 | 1.0 | 2.3 | 0.6 | Satisfied | Satisfied |
| 15 | 100 | 1.0 | 2.5 | 0.8 | Satisfied | Satisfied |
| 16 | 100 | 1.0 | 2.3 | 0.6 | Satisfied | Satisfied |
| 17 | 100 | 1.0 | 2.3 | 0.6 | Satisfied | Satisfied |
| 18 | 100 | 1.0 | 2.3 | 0.6 | Satisfied | Satisfied |
| 19 | 100 | 1.0 | 2.3 | 0.6 | Satisfied | Satisfied |
| 20 | 100 | 1.0 | 2.3 | 0.6 | Satisfied | Satisfied |
| 21 | 100 | 1.0 | 2.3 | 0.6 | Satisfied | Satisfied |
| 22 | 100 | 1.0 | 2.3 | 0.6 | Satisfied | Satisfied |
| 23 | 100 | 1.0 | 2.3 | 0.6 | Satisfied | Satisfied |
| 24 | 100 | 1.0 | 2.3 | 0.6 | Satisfied | Satisfied |

TABLE 1-3

Evaluation results

| | dipole-dipole force (mN/m) | Meat release properties | Adhesion of wax to lamination roll | Surface external appearance of can outer surface | Formability | Film adhesion | Impact resistance | Note |
|---|---|---|---|---|---|---|---|---|
| 1 | 26 | Good | Good | Very Good | Very Good | Very Good | Very Good | Example |
| 2 | 35 | Good | Good | Very Good | Very Good | Very Good | Very Good | Example |
| 3 | 38 | Good | Good | Very Good | Very Good | Very Good | Very Good | Example |
| 4 | 42 | Bad | Good | Very Good | Very Good | Very Good | Very Good | Comparative Example |
| 5 | 43 | Bad | Good | Very Good | Very Good | Very Good | Very Good | Comparative Example |
| 6 | 44 | Bad | Good | Fair | Very Good | Good | Good | Comparative Example |
| 7 | 25 | Good | Good | Very Good | Very Good | Very Good | Very Good | Example |
| 8 | 26 | Good | Good | Very Good | Very Good | Very Good | Very Good | Example |
| 9 | 35 | Good | Good | Very Good | Very Good | Very Good | Very Good | Example |
| 10 | 37 | Good | Good | Very Good | Very Good | Very Good | Very Good | Example |
| 11 | 38 | Good | Good | Very Good | Very Good | Very Good | Very Good | Example |
| 12 | 42 | Bad | Good | Very Good | Very Good | Very Good | Very Good | Comparative Example |
| 13 | 45 | Bad | Good | Very Good | Very Good | Very Good | Very Good | Comparative Example |
| 14 | 30 | Good | Good | Very Good | Very Good | Very Good | Very Good | Example |
| 15 | 32 | Good | Good | Very Good | Very Good | Very Good | Very Good | Example |
| 16 | 26 | Good | Good | Fair | Very Good | Very Good | Very Good | Example |
| 17 | 26 | Good | Good | Very Good | Very Good | Very Good | Very Good | Example |

TABLE 1-3-continued

| | dipole-dipole force (mN/m) | Meat release properties | Adhesion of wax to lamination roll | Surface external appearance of can outer surface | Formability | Film adhesion | Impact resistance | Note |
|---|---|---|---|---|---|---|---|---|
| 18 | 26 | Good | Good | Very Good | Fair | Very Good | Good | Example |
| 19 | 26 | Good | Good | Very Good | Very Good | Very Good | Very Good | Example |
| 20 | 26 | Good | Good | Very Good | Very Good | Very Good | Very Good | Example |
| 21 | 26 | Good | Good | Very Good | Very Good | Very Good | Very Good | Example |
| 22 | 26 | Good | Good | Very Good | Very Good | Very Good | Very Good | Example |
| 23 | 26 | Good | Good | Fair | Very Good | Very Good | Very Good | Example |
| 24 | 26 | Good | Good | Very Good | Fair | Very Good | Good | Example |

TABLE 2-1-1

| | Polyester film (inner surface side of containers) | | | | | | | | Properties | | | Polyester film (outer surface side of containers) | | | | Properties |
|---|---|---|---|---|---|---|---|---|---|---|---|---|---|---|---|---|
| Single layer/ multiple layers | A layer (metal sheet side) | | B layer (surface layer) | | Wax | | | Glass transition temperature of film Tg (° C.) | Melting point of wax Tm (° C.) | Single layer/ multiple layers | C layer (metal sheet side) | | D layer (surface layer) | | Crystallization temperature (° C.) |
| | Type of resin | Layer thickness (μm) | Type of resin | Layer thickness (μm) | Type | Addition amount (%) | | | | | Type of resin | Layer thickness (μm) | Type of resin | Layer thickness (μm) | |
| 25 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 50 mol %, polybutylene terephthalate: 50 mol % | 10 | Polyethylene terephthalate: 100 mol % | 2 | 86 |
| 26 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 50 mol %, polybutylene terephthalate: 50 mol % | 10 | Polyethylene terephthalate: 100 mol % | 2 | 86 |
| 27 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 50 mol %, polybutylene terephthalate: 50 mol % | 10 | Polyethylene terephthalate: 100 mol % | 2 | 86 |
| 28 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 50 mol %, polybutylene terephthalate: 50 mol % | 10 | Polyethylene terephthalate: 100 mol % | 2 | 86 |
| 29 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 50 mol %, polybutylene terephthalate: 50 mol % | 10 | Polyethylene terephthalate: 100 mol % | 2 | 86 |

TABLE 2-1-1-continued

| Single layer/ multiple layers | Polyester film (inner surface side of containers) ||| Properties ||||| Polyester film (outer surface side of containers) |||| Properties |
|---|---|---|---|---|---|---|---|---|---|---|---|---|---|
| | A layer (metal sheet side) || B layer (surface layer) || Wax || Glass transition temperature of film Tg (° C.) | Melting point of wax Tm (° C.) | Single layer/ multiple layers | C layer (metal sheet side) || D layer (surface layer) || Crystallization temperature (° C.) |
| | Type of resin | Layer thickness (μm) | Type of resin | Layer thickness (μm) | Type | Addition amount (%) | | | | Type of resin | Layer thickness (μm) | Type of resin | Layer thickness (μm) | |
| 30 Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 50 mol %, polybutylene terephthalate: 50 mol % | 10 | Polyethylene terephthalate: 100 mol % | 2 | 86 |

TABLE 2-1-2

| | Single layer/ multiple layers | Polyester film (inner surface side of containers) | | | | | | Properties | | | Polyester film (outer surface side of containers) | | | | Properties |
|---|---|---|---|---|---|---|---|---|---|---|---|---|---|---|---|
| | | A layer (metal sheet side) | | B layer (surface layer) | | Wax | | Glass transition temperature of film Tg (° C.) | Melting point of wax Tm (° C.) | Single layer/ multiple layers | C layer (metal sheet side) | | D layer (outer surface side) | | Crystallization temperature (° C.) |
| | | Type of resin | Layer thickness (μm) | Type of resin | Layer thickness (μm) | Type | Addition amount (%) | | | | Type of resin | Layer thickness (μm) | Type of resin | Layer thickness (μm) | |
| 31 | Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 50 mol %, polybutylene terephthalate: 50 mol % | 10 | Polyethylene terephthalate: 100 mol % | 2 | 86 |
| 32 | Multiple layers | Isophthalic acid-modified polyethylene terephthalate: 12 mol %, polyethylene terephthalate: 88 mol % | 17 | Polyethylene terephthalate: 100 mol % | 3 | Polyethylene wax (only surface layer) | 1.000 | 68 | 110 | Multiple layers | Polyethylene terephthalate: 50 mol %, polybutylene terephthalate: 50 mol % | 10 | Polyethylene terephthalate: 100 mol % | 2 | 86 |
| 33 | Multiple layers | Isophthalic acid-modified polyethylene terephthalate: 12 mol %, polyethylene terephthalate: 88 mol % | 17 | Polyethylene terephthalate: 100 mol % | 3 | High-melting-point polyethylene wax (only surface layer) | 1.000 | 68 | 130 | Multiple layers | Polyethylene terephthalate: 50 mol %, polybutylene terephthalate: 50 mol % | 10 | Polyethylene terephthalate: 100 mol % | 2 | 86 |
| 34 | Multiple layers | Isophthalic acid-modified polyethylene terephthalate: 12 mol %, polyethylene terephthalate: 88 mol % | 17 | Polyethylene terephthalate: 100 mol % | 3 | High-melting-point polyethylene wax (only surface layer) | 1.000 | 68 | 130 | Multiple layers | Polyethylene terephthalate: 50 mol %, polybutylene terephthalate: 50 mol % | 10 | Polyethylene terephthalate: 100 mol % | 2 | 86 |
| 35 | Multiple layers | Isophthalic acid-modified polyethylene terephthalate: 12 mol %, polyethylene terephthalate: 88 mol % | 17 | Polyethylene terephthalate: 100 mol % | 3 | High-melting-point polyethylene wax (only surface layer) | 1.000 | 68 | 130 | Multiple layers | Polyethylene terephthalate: 50 mol %, polybutylene terephthalate: 50 mol % | 10 | Polyethylene terephthalate: 100 mol % | 2 | 86 |

TABLE 2-1-2-continued

| | Polyester film (inner surface side of containers) | | | | | | Properties | | | Polyester film (outer surface side of containers) | | | | Properties |
|---|---|---|---|---|---|---|---|---|---|---|---|---|---|---|
| Single layer/ multiple layers | A layer (metal sheet side) | | B layer (surface layer) | | Wax | | Glass transition temperature of film Tg (° C.) | Melting point of wax Tm (° C.) | Single/ multiple layers | C layer (metal sheet side) | | D layer (surface layer) | | Crystallization temperature (° C.) |
| | Type of resin | Layer thickness (μm) | Type of resin | Layer thickness (μm) | Type | Addition amount (%) | | | | Type of resin | Layer thickness (μm) | Type of resin | Layer thickness (μm) | |
| 36 Multiple layers | Isophthalic acid-modified polyethylene terephthalate: 12 mol %, polyethylene terephthalate: 88 mol % | 17 | Polyethylene terephthalate: 100 mol % | 3 | High-melting-point polyethylene wax (only surface layer) | 1.000 | 68 | 130 | Multiple layers | Polyethylene terephthalate: 50 mol %, polybutylene terephthalate: 50 mol % | 10 | Polyethylene terephthalate: 100 mol % | 2 | 86 |

TABLE 2-1-3

| | | Polyester film (inner surface side of containers) | | | | | | Properties | |
|---|---|---|---|---|---|---|---|---|---|
| | Single layer/ multiple layers | A layer (metal sheet side) Type of resin | Layer thickness (μm) | B layer (surface layer) Type of resin | Layer thickness (μm) | Wax Type | Addition amount (%) | Glass transition temperature of film Tg (° C.) | Melting point of wax Tm (° C.) |
| 37 | Multiple layers | Isophthalic acid-modified polyethylene terephthalate: 12 mol %, polyethylene terephthalate: 88 mol % | 17 | Polyethylene terephthalate: 100 mol % | 3 | High-melting-point polyethylene wax (only surface layer) | 1 | 68 | 130 |
| 38 | Multiple layers | Isophthalic acid-modified polyethylene terephthalate: 12 mol %, polyethylene terephthalate: 88 mol % | 17 | Polyethylene terephthalate: 100 mol % | 3 | High-melting-point polyethylene wax (only surface layer) | 1 | 68 | 130 |
| 39 | Multiple layers | Isophthalic acid-modified polyethylene terephthalate: 12 mol %, polyethylene terephthalate: 88 mol % | 17 | Polyethylene terephthalate: 100 mol % | 3 | High-melting-point polyethylene wax (only surface layer) | 1 | 68 | 130 |
| 40 | Multiple layers | Isophthalic acid-modified polyethylene terephthalate: 12 mol %, polyethylene terephthalate: 88 mol % | 17 | Polyethylene terephthalate: 100 mol % | 3 | High-melting-point polyethylene wax (only surface layer) | 1 | 68 | 130 |
| 41 | Multiple layers | Isophthalic acid-modified polyethylene terephthalate: 12 mol %, polyethylene terephthalate: 88 mol % | 17 | Polyethylene terephthalate: 100 mol % | 3 | Polypropylene wax (only surface layer) | 1 | 68 | 160 |
| 42 | Multiple layers | Isophthalic acid-modified polyethylene terephthalate: 12 mol %, polyethylene terephthalate: 88 mol % | 17 | Polyethylene terephthalate: 100 mol % | 3 | Polypropylene wax (only surface layer) | 1 | 68 | 160 |

| | Polyester film (outer surface side of containers) | | | | |
|---|---|---|---|---|---|
| | | C layer (metal sheet side) | | D layer (surface layer) | | Properties |
| | Single layer/ multiple layers | Type of resin | Layer thickness (μm) | Type of resin | Layer thickness (μm) | Crystallization temperature (° C.) |
| 37 | Multiple layers | Polyethylene terephthalate: 50 mol %, polybutylene terephthalate: 50 mol % | 10 | Polyethylene terephthalate: 100 mol % | 2 | 86 |

TABLE 2-1-3-continued

| | | | | | | |
|---|---|---|---|---|---|---|
| 38 | Multiple layers | Polyethylene terephthalate: 50 mol %, polybutylene terephthalate: 50 mol % | 10 | Polyethylene terephthalate: 100 mol % | 2 | 86 |
| 39 | Multiple layers | Polyethylene terephthalate: 50 mol %, polybutylene terephthalate: 50 mol % | 10 | Polyethylene terephthalate: 100 mol % | 2 | 86 |
| 40 | Multiple layers | Polyethylene terephthalate: 50 mol %, polybutylene terephthalate: 50 mol % | 10 | Polyethylene terephthalate: 100 mol % | 2 | 86 |
| 41 | Multiple layers | Polyethylene terephthalate: 50 mol %, polybutylene terephthalate: 50 mol % | 10 | Polyethylene terephthalate: 100 mol % | 2 | 86 |
| 42 | Multiple layers | Polyethylene terephthalate: 50 mol %, polybutylene terephthalate: 50 mol % | 10 | Polyethylene terephthalate: 100 mol % | 2 | 86 |

TABLE 2-1-4

| | Polyester film (inner surface side of containers) | | | | | | Properties | |
|---|---|---|---|---|---|---|---|---|
| | Single layer/ multiple layers | A layer (metal sheet side) | | B layer (surface layer) | | Wax | | Glass transition | Melting |
| | | Type of resin | Layer thickness (μm) | Type of resin | Layer thickness (μm) | Type | Addition amount (%) | temperature of film Tg (° C.) | point of wax Tm (° C.) |
| 43 | Multiple layers | Isophthalic acid-modified polyethylene terephthalate: 12 mol %, polyethylene terephthalate: 88 mol % | 17 | Polyethylene terephthalate: 100 mol % | 3 | Polypropylene wax (only surface layer) | 1.000 | 68 | 160 |
| 44 | Multiple layers | Isophthalic acid-modified polyethylene terephthalate: 12 mol %, polyethylene terephthalate: 88 mol % | 17 | Polyethylene terephthalate: 100 mol % | 3 | Sodium stearate (only surface layer) | 1.000 | 68 | 160 |
| 45 | Multiple layers | Isophthalic acid-modified polyethylene terephthalate: 12 mol %, polyethylene terephthalate: 88 mol % | 17 | Polyethylene terephthalate: 100 mol % | 3 | Sodium stearate (only surface layer) | 1.000 | 68 | 160 |
| 46 | Single layer | Isophthalic acid-modified polyethylene terephthalate: 12 mol %, polyethylene terephthalate: 88 mol % | 20 | | | Polyethylene wax 0.5% + Polypropylene wax 0.5% | 1.000 | 68 | Polyethylene wax: 110 Polypropylene wax: 160 |

TABLE 2-1-4-continued

| | | | | | | | |
|---|---|---|---|---|---|---|---|
| 47 | Single layer | Isophthalic acid-modified polyethylene terephthalate: 12 mol %, polyethylene terephthalate: 88 mol % | 20 | | High-melting-point polyethylene wax | 1.000 | 120 | 130 |
| 48 | Single layer | polyethylene terephthalate: 50 mol %, polyethylene naphthalate: 50 mol % | 20 | | High-melting-point polyethylene wax | 1.000 | 95 | 130 |

| | | Polyester film (outer surface side of containers) | | | | |
|---|---|---|---|---|---|---|
| | | C layer (metal sheet side) | | D layer (surface layer) | | Properties |
| | Single layer/ multiple layers | Type of resin | Layer thickness (μm) | Type of resin | Layer thickness (μm) | Crystallization temperature (° C.) |
| 43 | Multiple layers | Polyethylene terephthalate: 50 mol %, polybutylene terephthalate: 50 mol % | 10 | Polyethylene terephthalate: 100 mol % | 2 | 86 |
| 44 | Multiple layers | Polyethylene terephthalate: 50 mol %, polybutylene terephthalate: 50 mol % | 10 | Polyethylene terephthalate: 100 mol % | 2 | 86 |
| 45 | Multiple layers | Polyethylene terephthalate: 50 mol %, polybutylene terephthalate: 50 mol % | 10 | Polyethylene terephthalate: 100 mol % | 2 | 86 |
| 46 | Multiple layers | Polyethylene terephthalate: 50 mol %, polybutylene terephthalate: 50 mol % | 10 | Polyethylene terephthalate: 100 mol % | 2 | 86 |
| 47 | Multiple layers | Polyethylene terephthalate: 50 mol %, polybutylene terephthalate: 50 mol % | 10 | Polyethylene terephthalate: 100 mol % | 2 | 86 |
| 48 | Multiple layers | Polyethylene terephthalate: 50 mol %, polybutylene terephthalate: 50 mol % | 10 | Polyethylene terephthalate: 100 mol % | 2 | 86 |

TABLE 2-2

| | Temperature of lamination roll Tr (° C.) | Time t taken from end of laminating step to start of cooling step (seconds) | $2.6 - \{0.4/(Tm - Tg)\} \times (Tr - Tg)$ | $0.9 - \{0.4/(Tm - Tg)\} \times (Tr - Tg)$ | $Tr \geq Tg$ | $Tr \leq Tm$ |
|---|---|---|---|---|---|---|
| 25 | 110 | 0.5 | 2.2 | 0.5 | Satisfied | Satisfied |
| 26 | 70 | 0.9 | 2.6 | 0.9 | Satisfied | Satisfied |
| 27 | 70 | 2.6 | 2.6 | 0.9 | Satisfied | Satisfied |
| 28 | 110 | 2.2 | 2.2 | 0.5 | Satisfied | Satisfied |
| 29 | <u>115</u> | 1.0 | 2.2 | 0.5 | Satisfied | Not satisfied |

TABLE 2-2-continued

| | Temperature of lamination roll Tr (° C.) | Time t taken from end of laminating step to start of cooling step (seconds) | 2.6 − {0.4/(Tm − Tg)} × (Tr − Tg) | 0.9 − {0.4/(Tm − Tg)} × (Tr − Tg) | Tr ≥ Tg | Tr ≤ Tm |
|---|---|---|---|---|---|---|
| 30 | 110 | 3.0 | 2.2 | 0.5 | Satisfied | Satisfied |
| 31 | 100 | 0.2 | 2.3 | 0.6 | Satisfied | Satisfied |
| 32 | 60 | 1.5 | 2.7 | 1.0 | Satisfied | Satisfied |
| 33 | 130 | 0.5 | 2.2 | 0.5 | Satisfied | Satisfied |
| 34 | 70 | 0.9 | 2.6 | 0.9 | Satisfied | Satisfied |
| 35 | 70 | 2.6 | 2.6 | 0.9 | Satisfied | Satisfied |
| 36 | 130 | 2.2 | 2.2 | 0.5 | Satisfied | Satisfied |
| 37 | 140 | 1.0 | 2.1 | 0.4 | Satisfied | Not satisfied |
| 38 | 110 | 3.0 | 2.3 | 0.6 | Satisfied | Satisfied |
| 39 | 110 | 0.2 | 2.3 | 0.6 | Satisfied | Satisfied |
| 40 | 60 | 1.5 | 2.7 | 1.0 | Not satisfied | Satisfied |
| 41 | 130 | 1.0 | 2.3 | 0.6 | Satisfied | Satisfied |
| 42 | 150 | 1.0 | 2.2 | 0.5 | Satisfied | Satisfied |
| 43 | 170 | 1.0 | 2.2 | 0.5 | Satisfied | Not satisfied |
| 44 | 80 | 1.0 | 2.5 | 0.8 | Satisfied | Satisfied |
| 45 | 120 | 1.0 | 2.0 | 0.3 | Satisfied | Not satisfied |
| 46 | 100 | 1.0 | 2.3 | 0.6 | Satisfied | Satisfied |
| 47 | 125 | 1.0 | 2.4 | 0.7 | Satisfied | Satisfied |
| 48 | 125 | 1.0 | 2.3 | 0.6 | Satisfied | Satisfied |

TABLE 2-3

| | Evaluation results | | | | | | | |
|---|---|---|---|---|---|---|---|---|
| | dipole-dipole force (mN/m) | Meat release properties | Adhesion of wax to lamination roll | Surface external appearance of can outer surface | Formability | Film adhesion | Impact resistance | Note |
| 25 | 26 | Good | Good | Very Good | Very Good | Very Good | Very Good | Example |
| 26 | 26 | Good | Good | Very Good | Very Good | Very Good | Very Good | Example |
| 27 | 26 | Good | Good | Very Good | Very Good | Very Good | Very Good | Example |
| 28 | 26 | Good | Good | Very Good | Very Good | Very Good | Very Good | Example |
| 29 | 42 | Bad | Bad | Very Good | Very Good | Very Good | Very Good | Comparative Example |
| 30 | 41 | Bad | Good | Very Good | Very Good | Bad | Very Good | Comparative Example |
| 31 | 45 | Bad | Good | Very Good | Very Good | Very Good | Very Good | Comparative Example |
| 32 | 45 | Bad | Good | Very Good | Very Good | Very Good | Very Good | Comparative Example |
| 33 | 26 | Good | Good | Very Good | Very Good | Very Good | Very Good | Example |
| 34 | 26 | Good | Good | Very Good | Very Good | Very Good | Very Good | Example |
| 35 | 26 | Good | Good | Very Good | Very Good | Very Good | Very Good | Example |
| 36 | 26 | Good | Good | Very Good | Very Good | Very Good | Very Good | Example |
| 37 | 42 | Bad | Bad | Very Good | Very Good | Very Good | Very Good | Comparative Example |
| 38 | 41 | Bad | Good | Very Good | Very Good | Bad | Very Good | Comparative Example |
| 39 | 45 | Bad | Good | Very Good | Very Good | Very Good | Very Good | Comparative Example |
| 40 | 45 | Bad | Good | Very Good | Very Good | Very Good | Very Good | Comparative Example |
| 41 | 30 | Good | Good | Very Good | Very Good | Very Good | Very Good | Example |

TABLE 2-3-continued

| | dipole-dipole force (mN/m) | Meat release properties | Adhesion of wax to lamination roll | Surface external appearance of can outer surface | Formability | Film adhesion | Impact resistance | Note |
|---|---|---|---|---|---|---|---|---|
| 42 | 30 | Good | Good | Very Good | Very Good | Very Good | Very Good | Example |
| 43 | 42 | Bad | Bad | Very Good | Very Good | Very Good | Very Good | Comparative Example |
| 44 | 32 | Good | Good | Very Good | Very Good | Very Good | Very Good | Example |
| 45 | 42 | Bad | Bad | Very Good | Very Good | Very Good | Very Good | Comparative Example |
| 46 | 26 | Good | Good | Very Good | Very Good | Very Good | Very Good | Example |
| 47 | 28 | Good | Good | Very Good | Very Good | Very Good | Very Good | Example |
| 48 | 27 | Good | Good | Very Good | Very Good | Very Good | Very Good | Example |

INDUSTRIAL APPLICABILITY

According to the above-described embodiment, it is possible to provide a metal sheet for containers having an excellent content release properties and a method for manufacturing the same.

BRIEF DESCRIPTION OF THE REFERENCE SYMBOLS

1 METAL SHEET
3 POLYESTER FILM (POLYESTER FILM FORMED ON SURFACE THAT IS ON INNER SURFACE SIDE OF CONTAINERS)
5 POLYESTER FILM (POLYESTER FILM FORMED ON SURFACE THAT IS ON OUTER SURFACE SIDE OF CONTAINERS)
7 LAYER FORMED ON METAL SHEET SIDE OF INNER SURFACE OF CONTAINER (A LAYER)
9 LAYER WHICH IS TOP LAYER ON INNER SURFACE SIDE OF CONTAINERS AFTER LAMINATION (B LAYER)
10 METAL SHEET FOR CONTAINERS
11 LAYER FORMED ON METAL SHEET SIDE OF OUTER SURFACE OF CONTAINER (C LAYER)
13 LAYER WHICH IS TOP LAYER ON OUTER SURFACE SIDE OF CONTAINERS AFTER LAMINATION (D LAYER)

The invention claimed is:

1. A metal sheet for containers, comprising:
a metal sheet; and
a polyester film which is scheduled to be an inner surface side of containers and which is laminated on a surface of the metal sheet, wherein the polyester film is a stacked laminate film comprising at least a first layer and a second layer, the first layer being on a metal sheet side of the polyester film, and the second layer being on top of the first layer on a side opposite to the metal sheet side,
wherein the second layer of the polyester film contains a wax in an amount of 0.010 to 2.000 mass %,
wherein the first layer of the polyester film contains isophthalic acid-modified polyethylene terephthalate,
wherein a total amount of polyethylene terephthalate and polyethylene naphthalate in the second layer is 80 mol % or more of the polyester included in said second layer,
wherein an amount of polybutylene terephthalate in the first layer is 5 to 80 mol % of the polyester included in said first layer, and
wherein the second layer of the polyester film has a dipole-dipole force of 20 mN/m to 40 mN/m.

2. The metal sheet for containers according to claim 1, wherein the wax is any or a plurality of a polyethylene wax, a polypropylene wax, and sodium stearate.

3. The metal sheet for containers according to claim 1, wherein a polyester film having a crystallization temperature of 120° C. or lower is laminated on a surface of the metal sheet, which is scheduled to be an outer surface side of containers.

4. A method for manufacturing a metal sheet for containers, comprising:
a laminating step of passing a metal sheet and a polyester film comprising at least a first layer and a second layer, the first layer being on a metal sheet side of the polyester film, and the second layer being on top of the first layer on a side opposite to the metal sheet side and containing polyester and 0.010 to 2.000 mass % of a wax through a pair of lamination rolls in a sandwiched state to laminate the polyester film on a surface of the metal sheet which is scheduled to be an inner surface side of containers; and
a cooling step of cooling the metal sheet having the polyester film laminated on the surface after the laminating step,
wherein Tr (unit: ° C.) that is a temperature of the pair of lamination rolls is equal to or higher than Tg (unit: ° C.) that is a glass transition temperature of the polyester film and equal to or lower than Tm (unit: ° C.) that is a melting point of the wax,
t (unit: seconds) that is a time taken from an end of the laminating step to a start of the cooling step satisfies Expression (1):

$$0.9 - \{0.4/(Tm-Tg)\} \times (Tr-Tg) \leq t \leq 2.6 - \{0.4/(Tm-Tg)\} \times (Tr-Tg) \quad (1)$$

and
the second layer after the cooling step has a dipole-dipole force of 20 mN/m to 40 mN/m.

5. A metal sheet for containers manufactured using the method for manufacturing a metal sheet for containers according to claim 4, the metal sheet for containers comprising:
- a metal sheet; and
- a polyester film which is scheduled to be an inner surface side of containers and which is laminated on a surface of the metal sheet, wherein the polyester film is a stacked laminate film comprising at least a first layer and a second layer, the first layer being on a metal sheet side of the polyester film, and the second layer being on top of the first layer on a side opposite to the metal sheet side,
- wherein the second layer of the polyester film contains a wax in an amount of 0.010 to 2.000 mass %,
- wherein the first layer of the polyester film contains isophthalic acid-modified polyethylene terephthalate,
- wherein a total amount of polyethylene terephthalate and polyethylene naphthalate in the second layer is 80 mol % or more of the polyester included in said second layer,
- wherein an amount of polybutylene terephthalate in the first layer is 5 to 80 mol % of the polyester included in said first layer, and
- wherein the second layer of the polyester film has a dipole-dipole force of 20 mN/m to 40 mN/m.

6. The metal sheet for containers according to claim 5, wherein the wax is any or a plurality of a polyethylene wax, a polypropylene wax, and sodium stearate.

7. The metal sheet for containers according to claim 5, wherein a polyester film having a crystallization temperature of 120° C. or lower is laminated on a surface of the metal sheet, which is scheduled to be an outer surface side of containers.

* * * * *